(12) United States Patent
Miller

(10) Patent No.: US 10,890,927 B2
(45) Date of Patent: Jan. 12, 2021

(54) PERSISTENT SURVEILLANCE UNMANNED AERIAL VEHICLE AND LAUNCH/RECOVERY PLATFORM SYSTEM AND METHOD OF USING WITH SECURE COMMUNICATION, SENSOR SYSTEMS, TARGETING SYSTEMS, LOCATING SYSTEMS, AND PRECISION LANDING AND STABILIZATION SYSTEMS

(71) Applicant: The United States of America, as represented by the Secretary of the Navy, Crane, IN (US)

(72) Inventor: Gerald Francis Miller, Bedford, IN (US)

(73) Assignee: The United States of America, as represented by the Secretary of the Navy, Washington, DC (US)

( * ) Notice: Subject to any disclaimer, the term of this patent is extended or adjusted under 35 U.S.C. 154(b) by 251 days.

(21) Appl. No.: 15/885,152

(22) Filed: Jan. 31, 2018

(65) Prior Publication Data
US 2019/0086920 A1 Mar. 21, 2019

Related U.S. Application Data

(60) Provisional application No. 62/561,563, filed on Sep. 21, 2017.

(51) Int. Cl.
*G05D 1/00* (2006.01)
*G05D 1/10* (2006.01)
(Continued)

(52) U.S. Cl.
CPC ............ *G05D 1/106* (2019.05); *B64C 39/024* (2013.01); *B64D 17/80* (2013.01); *B64F 1/02* (2013.01);
(Continued)

(58) Field of Classification Search
CPC .. G05D 1/0094; G05D 1/0038; G02B 27/017; B64F 3/02; B64C 2201/082;
(Continued)

(56) References Cited

U.S. PATENT DOCUMENTS

| 2010/0034424 A1* | 2/2010 | Goossen | F41G 3/02 |
| | | | 382/103 |
| 2012/0044710 A1* | 2/2012 | Jones | F42B 12/42 |
| | | | 362/470 |

(Continued)

*Primary Examiner* — Christopher D Hutchens
(74) *Attorney, Agent, or Firm* — Naval Surface Warfare Center, Crane Division; Christopher A. Monsey

(57) ABSTRACT

Apparatus and methods are provided for providing persistent aerial vehicle surveillance capabilities, including launch and recovery platforms, secured communication, sensor systems, targeting systems, locating systems, and precision landing and stabilization systems for such uses as assisting with base defenses, monitoring parking lots or facilities, providing security monitoring, assisting farmers, performing recon of enemy beaches or use by mortar teams in hostile fields of operations. One embodiment can include an aerial surveillance system using an aerial short wave infrared surveillance system platform for use when quick response in reaction to real-time conditions is preferred while relaying the geo-location and other monitoring assistance via a wireless, fiber optic type link, or an ADHOC GPS system. Embodiments of this disclosure provides a user with precise targeting, without manned air assets, and a highly mobile base of operations with swift relocation possibilities in a denied or hostile environment.

27 Claims, 14 Drawing Sheets

(51) Int. Cl.
  *B64C 39/02* (2006.01)
  *B64F 3/02* (2006.01)
  *B64F 1/36* (2017.01)
  *B64F 1/02* (2006.01)
  *B64D 17/80* (2006.01)
  *H04N 7/18* (2006.01)
  *G02B 27/01* (2006.01)
  *G02B 27/64* (2006.01)
  *H04N 5/232* (2006.01)

(52) U.S. Cl.
  CPC ............... *B64F 1/364* (2013.01); *B64F 3/02* (2013.01); *G02B 27/017* (2013.01); *G02B 27/0172* (2013.01); *G02B 27/644* (2013.01); *G05D 1/0094* (2013.01); *H04N 5/2328* (2013.01); *H04N 7/181* (2013.01); *H04N 7/185* (2013.01); *B64C 2201/027* (2013.01); *B64C 2201/042* (2013.01); *B64C 2201/06* (2013.01); *B64C 2201/123* (2013.01); *B64C 2201/127* (2013.01); *B64C 2201/141* (2013.01); *B64C 2201/148* (2013.01); *G02B 2027/0141* (2013.01); *H04N 5/23299* (2018.08)

(58) Field of Classification Search
  CPC ........ B64C 2201/148; B64C 2201/127; B64C 39/022; B64D 1/08
  See application file for complete search history.

(56) References Cited

U.S. PATENT DOCUMENTS

| | | | |
|---|---|---|---|
| 2013/0233964 A1* | 9/2013 | Woodworth | B64D 17/80 244/2 |
| 2014/0263852 A1* | 9/2014 | Walker | B64C 39/024 244/53 R |
| 2016/0138893 A1* | 5/2016 | Rastegar | G06T 7/73 382/103 |
| 2018/0009549 A1* | 1/2018 | Sullivan | B64F 1/22 |
| 2018/0059660 A1* | 3/2018 | Heatzig | B64D 47/08 |
| 2018/0118374 A1* | 5/2018 | Lombardini | B60L 9/00 |
| 2018/0255465 A1* | 9/2018 | Priest | G01C 11/06 |
| 2019/0068953 A1* | 2/2019 | Choi | G01S 17/86 |

* cited by examiner

PERSISTENT SURVEILLANCE UNMANNED AERIAL VEHICLE AND LAUNCH/RECOVERY PLATFORM SYSTEM AND METHOD OF USING WITH SECURE COMMUNICATION, SENSOR SYSTEMS, TARGETING SYSTEMS, LOCATING SYSTEMS, AND PRECISION LANDING AND STABILIZATION SYSTEMS

CROSS REFERENCE TO RELATED APPLICATIONS

This application claims priority under 35 U.S.C. 119(e) of U.S. provisional patent application Ser. No. 62/561,563 filed on Sep. 21, 2017 entitled PERSISTENT SURVEILLANCE UNMANNED AERIAL VEHICLE AND LAUNCH/RECOVERY PLATFORM SYSTEM WITH SECURE COMMUNICATION, SENSOR SYSTEMS, TARGETING SYSTEMS, LOCATING SYSTEMS, AND PRECISION LANDING AND STABILIZATION SYSTEMS the disclosure of which is hereby incorporated herein by reference.

STATEMENT REGARDING FEDERALLY SPONSORED RESEARCH OR DEVELOPMENT

The invention described herein was made in the performance of official duties by employees of the Department of the Navy and may be manufactured, used and licensed by or for the United States Government for any governmental purpose without payment of any royalties thereon. This invention (Navy Case 200,460) is assigned to the United States Government and is available for licensing for commercial purposes. Licensing and technical inquiries may be directed to the Technology Transfer Office, Naval Surface Warfare Center Crane, email: Cran_CTO@navy.mil.

BACKGROUND AND SUMMARY OF THE INVENTION

The field of the invention relates generally to unmanned airborne surveillance systems which provide persistent surveillance capabilities in austere or remote environments that lack access to a variety of resources (e.g., fuel resources) and are in a high risk environment thus require remote deployment and in some embodiments remote recovery. In particular, various embodiments of the invention include various self-contained elements along with sensor and communication capabilities including secure communication and visual sensors as well as remote targeting or geo-locating capabilities from a mobile platform with an air deployable power system.

Existing systems do not meet various user requirements. Generally, a deployable or portable persistent surveillance requires rapid movement and setup; ability to operate in remote environments that is, in some cases, hostile or a denied movement environment; a robust, survivable, assured network communication capability, a networked enterprise to link and synchronize various tiers or systems of sensor system employment, data accessibility, and analytic effort; an enhanced system-level analytical and information exploitation tools that fill gaps in our ability to see and understand entities and activities within a given area or environment; planning tools and control methodologies for coordinating and controlling multiple data collection, analysis and information processing systems; and an ability to detect a change in the area or environment of interest. Surveillance paradigms are rapidly evolving from periodic, forensic surveillance to persistent surveillance reliant on integrated systems and predictive analysis. Based on the commander's prioritized requirements, persistent surveillance should capture both ongoing specific activity and, if necessary, forensically reconstruct activity after the event. Embodiments that are needed support a collection strategy that emphasizes an ability of some collections systems to linger on demand in an area to detect, locate, characterize, identify, track, target, and possibly provide battle damage assessment and re-targeting in real or near real time. Persistent surveillance facilitates the formulation and execution of preemptive activities to deter or forestall anticipated adversary courses of action. Various needs also include a capability supporting inclusion of synchronization and integration that reinforces operations and intelligence functions that are fully linked down to a lowest echelon and include sensors commonly associated with intelligence collection activities. Other capabilities that are needed include total sensor visibility, dynamic cueing, manned and unmanned teaming, and seamless system networking providing synchronization and integration elements. Additional capabilities include capacity to locate, track and target. Locate allows users to know precisely where the entity of interest is in an operational environment. Detection and location are not synonymous. Some sensors will only detect the entity then alert the system to focus its assets to precisely locate and characterize the entity. Tracking includes an ability to display or record the successive positions of a moving object in spite of natural obstacles or man-made countermeasures. This temporal requirement must be met to ensure that targets do not disappear and requires networked sensor integration and survivability. Targeting allows users to link all necessary entities or functions to address a given entity of interest or target as a mission requires which includes performance of a variety of tasks.

Desired capabilities further include includes denial of sanctuary or ability to operate without being observed by providing persistent surveillance, tracking, and rapid engagement with high-volume precision task or application of effects. Another capability includes finding and performing tasks with respect to an entity while limiting unwanted effects such as collateral damage. Another set of desired capabilities includes developing a means to deny sanctuary to potential adversaries for a specific mission, area, and time period, support to application of long range systems to an entity of interest, extending surveillance and information collection across time, space, and information domains that is resistant to determined denial and deception efforts. Another desired need is to match a frequency of revisit with time stability of the object that a user is looking at—the speed with which things change. Another desired capability is support operations against any target, day or night, in any weather, and in denied or contested areas as well as enabling internetworking with other surveillance platforms or command nodes add gaining an understanding of entities of interest and operational environment continuously and in near real time to maneuver across strategic distances. Various limitations have been found in existing capabilities including: surveillance sensors are high demand/low density assets; users must prioritize and clearly define intelligence requirements and acknowledge risk in areas/objects not identified as priorities; achieved only for specific periods of time against extremely critical entities of interest; and dilutes efforts against other entities of interest priorities due to extended focus and allocation of sensors directed against one entity.

In various embodiments it can be ideal to have a system that can accurately pinpoint the location of activity of interest and accurately and reliably convey information on location and activity to an exemplary user. At least some embodiments of the invention seeks to achieve real-time geo-location tracking of the activity via an aerial surveillance system that provides aerial surveillance capability to exemplary users such that they can know exactly where an activity of interest is located and provide real-time geo-location and positioning information for extremely accurate targeting of the activity of interest. Embodiments of this disclosure provides a user with precise targeting, without manned air assets, a base of operation that is highly mobile and allows swift relocation, and a capability to operate in a denied or hostile environment or in relatively close proximity to such an environment.

An exemplary embodiment of the invention relates to an aerial surveillance system enabled by an aerial short wave infrared (SWIR) surveillance system platform for use in an exemplary field of operation where a quick response is preferred in reaction to real-time conditions by relaying the geo-location and other monitoring assistance via wireless or fiber SWIR optic links. An embodiment is capable of performance and deployment in many different conditions including any time of day (whether dark or light) and wide varieties of weather. Embodiments can include an aerial surveillance system that can be used in various applications such as to assist with base defenses, monitor parking lots or facilities, provide security monitoring, assist farmers planting fields, or assisting in the coordination of planting crops, or use by mortar crews in an exemplary hostile field of operation and in conjunction with mortars, e.g., the M30 mortar. According to a further illustrative embodiment of the present disclosure, an exemplary aerial surveillance system can be used to monitor any activity that would benefit from real-time information being relayed to the user.

Additional features and advantages of the present invention will become apparent to those skilled in the art upon consideration of the following detailed description of the illustrative embodiment exemplifying the best mode of carrying out the invention as presently perceived.

BRIEF DESCRIPTION OF THE DRAWINGS

The detailed description of the drawings particularly refers to the accompanying figures in which.

DETAILED DESCRIPTION OF THE DRAWINGS

Embodiments of the disclosure described herein are not intended to be exhaustive or to limit the disclosure to precise forms disclosed. Rather, the embodiments selected for description have been chosen to enable one skilled in the art to practice the disclosure.

Figure 1:
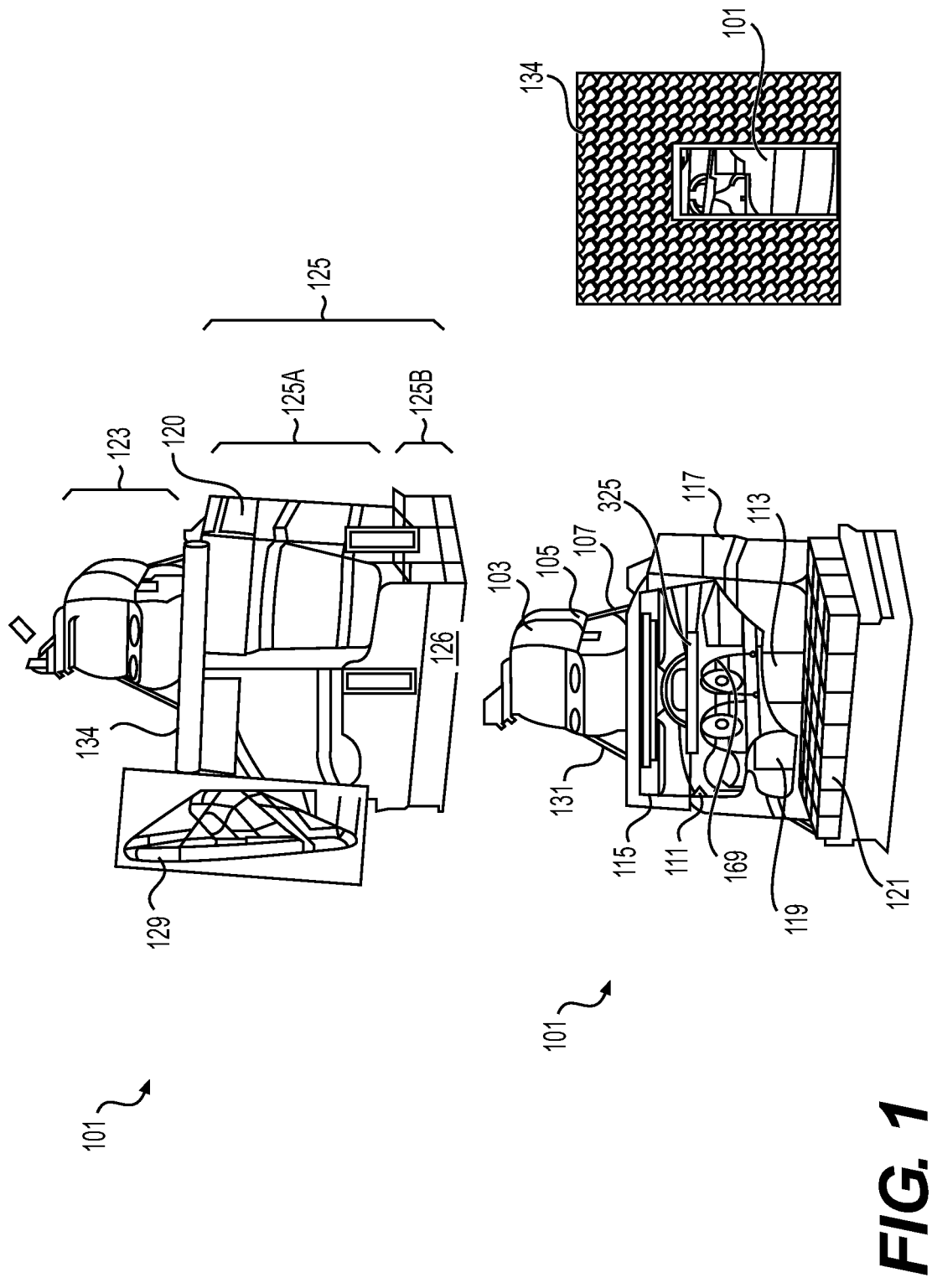
FIG. 1 shows an exemplary longitudinal view (top) and partial cross section view (bottom) of an unmanned aerial vehicle (UAV) with launch, persistent surveillance enablement, and recovery (PSER) platform system in accordance with one exemplary embodiment.

Referring initially to FIG. 1, a longitudinal and partial cross section view of an exemplary UAV 107 with an exemplary PSER platform system 101 is shown. This exemplary PSER platform system 101 includes a first section 123 and a second section 125. The first section 123 and second section 125 are coupled to one another via removable coupling sections 120, e.g., cargo straps. The first section 123 includes a deployable powered parachute or parafoil system (DPPPS) 103, a propulsion system 129 (optional), and a guidance navigation system (e.g., see 323, 5). The DPPPS 103 attaches to the first section 123 via a detachable and reattachable cable 131, which extends from the DPPPS 103 to the second section 125. An alternative embodiment can be provided that, upon landing, the DPPPS 103 retracts into a parachute storage container (e.g., see 319, FIG. 5). At the target destination (e.g., see 381, FIG. 6), a cover 115 of the second section 125 retracts, allowing for UAV 107 to be deployed from PSER platform system 101. Cover 115 may be retracted or opened through any suitable mechanical system, The cover 115 can also be jettisoned as well including by, e.g., release mechanisms or servos (not shown) that are controlled by an onboard control system or if the cover retraction system malfunctions for example.

The second section 125 of PSER platform system 101 includes several components of the exemplary system comprising a UAV 107, UAV launch and recovery base system 325, generator 119, tether 169, slip ring assembly 117, feed guide motor 111, fuel (e.g., see 114, FIG. 5), and fuel storage bladder 113.

The second section 125 may include two separate sub-sections: a retrievable section 125A and an expendable section 125B. In some embodiments, retrievable section 125A is releasably coupled to expendable section 125B with releasable couplers 126 (two of which are shown but releasable couplers 126 on opposing sides not shown). The releasable couplers 126 may be attached on each side of the second section 125. In other embodiments, there may be multiple releasable couplers 126 on each side of the second section 125, while still other embodiments the releasable couplers 126 may be attached on only one side of second section 125 up to every side of the second section 125 or any arrangement in between to include releasable couplers 126 between the two sections on an interior section or a non-side section. Within the second section 125, the UAV 107, in its non-deployable position, rests on UAV launch and recovery base system 325, and may be selectively coupled to generator 119 via tether 169. In some embodiments, UAV 107 may be disposed within the retrievable section 125A. Launch and recovery base system 325 holds and locks into place UAV 107 when not in use. Launch and recovery base system may include a UAV retainer system (not shown) which is configured to hold the UAV in place while the PSER platform system 101 is in motion. In some embodiments, UAV retainer may include selectively coupling structures (e.g. servo operated clamps) that lock the UAV in place, while in other embodiments, other mechanical or electro-mechanical structures (e.g., Velcro® on the UAV landing structure and surface it rests upon) may be used to hold UAV in place to prevent damage when PSER platform system 101 is in motion. Slack from tether 169 may be coiled around slip ring assembly 117 until UVA 107 deploys, at which point tether 169 passes through feed guide motor 111 until fully extended. Feed guide motor 111 contains a reversing mechanism (e.g., see 112, FIG. 5) and reels tether 169 back onto slip ring assembly 117 until UAV 107 is coupled to launch and recovery base system 325. Feed guide motor 111 also keeps tension on tether 169. Tether 169 connection increases flight time and prevents jamming and unfriendly or otherwise hostile control of UAV 107.

In UAV's 107 deployed state, UAV 107 may launch to about 3000 feet vertically, depending on the terrain. This exemplary launch height provides users with range and geo-location of enemy combatants within target area (e.g., see 403, FIG. 7) and prevents combatants from locating PSER platform system 101.

Tether 169 also may transfer power from the generator 119 to the UAV 107. Generator 119 is powered by fuel (e.g., see 114, FIG. 5) stored in fuel storage bladder 113 or by optional battery pack 121, both of which are stored in the second section 125. In some embodiments, the generator 119, fuel storage bladder 113 or optional battery pack 121 may be included in the expendable section 125B. In other embodiments generator 119 may be disposed in the retrievable section 125A. The UAV 107 may also deploy from the PSER platform system 101 in an untethered state and include its own auxiliary power source (e.g., see 173, FIG. 3).

Figure 6:
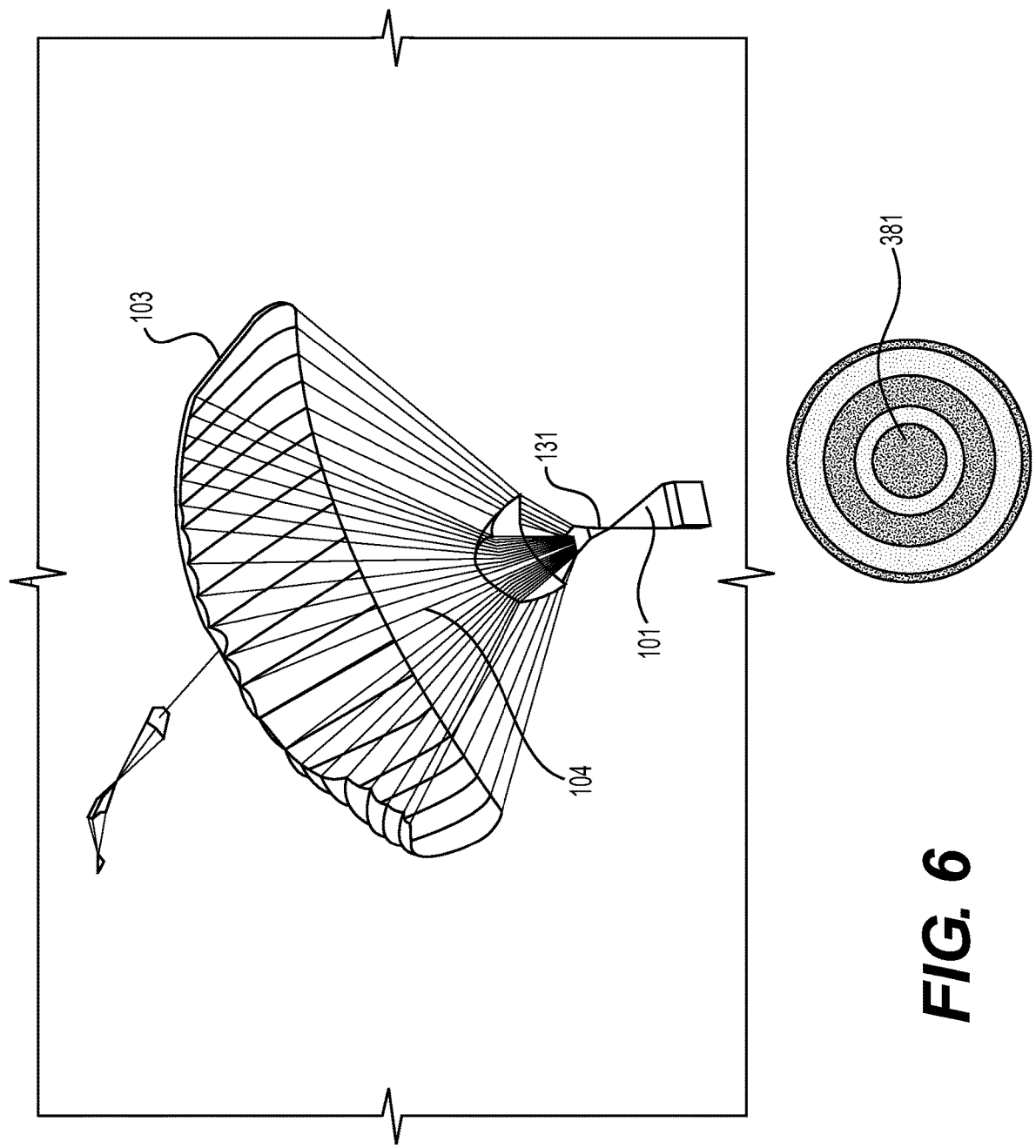
FIG. 6 shows a longitudinal view of an airdrop system enabling autonomous navigation to a landing target for an exemplary PSER Platform System.

Expendable section 125B may by constructed to allow for safe landing at the target destination (e.g., see 381, FIG. 6). For example, expendable section 125B can optionally include a mechanism configured to safely disperse the force and lessen the impact of landing on hard surfaces, such as by using wooden boards, spring-like or shock absorber mechanisms, an adjustable pressure airbag, or a crush section (not shown) to absorb kinetic energy from a hard landing.

Alternatively, expendable section 125B can optionally comprise a buoyancy system (e.g., see 321, FIG. 5) allowing PSER platform system 101 to float in water. PSER platform system 101 can then be optionally guided around the water with deployed UAV 107. An alternative embodiment may include an optional anchor system (e.g., see 327, FIG. 5), which anchors launch barrel 101 to the bottom of a body of water. This allows for PSER platform system 101 to remain in place if UAV 107 is in its untethered state. Further alternative embodiments can also be provided with a drivetrain (not shown) and wheels (not shown) coupled with the expendable section 125B and configured to be guided by personnel off-site via a remote connection.

The exemplary PSER platform system 101 is adapted to be launched or ejected from an aircraft (e.g., see 502, FIG. 11B), after which the DPPPS 103 deploys and expands guiding the exemplary PSER platform system 101 to its target destination (e.g., see 381, FIG. 6).

Additionally, to conceal PSER platform system 101, an optional PSER platform system concealment system 134 may cover at least a portion of the PSER platform system 101 resulting in the PSER platform system 101 being camouflaged with the surrounding environment. In one variant, PSER platform concealment system 134 may be deployed upon landing such that a force against the bottom of the second section 125 will release the PSER platform concealment system 134 to cloak or cover at least portions of the PSER platform system 101. Sections of the PSER platform concealment system 134 can include camouflage, extendable sheets, etc. that can drop and unroll from a stored configuration via gravity and weights or extend from a roller controlled by a motor that roll down a guideline or track system at its edges, etc. These camouflage sections can be released from the second section 125 by servo controlled or mechanical latches connected to actuators of some type when the second section 125 is retrieved or extracted in order to lighten its weight. In some embodiments, the PSER platform system 101 may include a platform surveillance system (not shown). The surveillance system may comprise a camera to survey the environment and identify approaching threats. The camera may be configured to rotate 360 degrees around the PSER platform system 101. A motion detector may be included in the surveillance system and configured to activate the camera once movement is detected. The surveillance system can be in communication with the communications system (e.g., see 163, FIG. 3) or base control system 300 (shown in FIG. 5). For example, if surveillance system is activated, it can send a control signal or power command to a decoupler mechanism to detach the UAV 107 from PSER platform system 101 so it will not be apprehended by hostiles.

Figure 2:
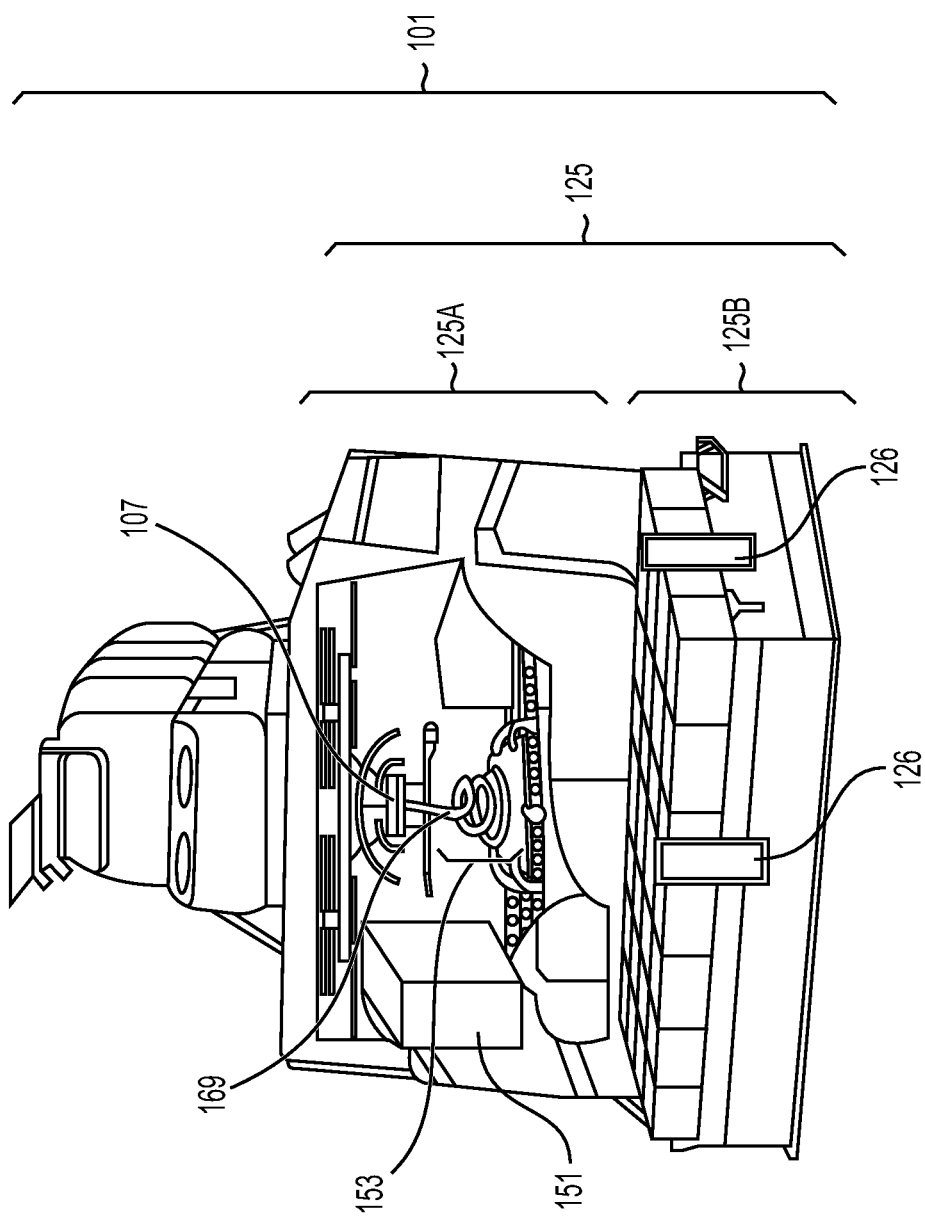
FIG. 2 shows an alternative exemplary longitudinal view and partial cross section of the exemplary UAV with PSER platform embodiments such as shown in FIG. 1 suitable for use with a tether power cable feed from a power transfer system, e.g., cone spool.

Referring to FIG. 2, a longitudinal and partial cross-sectional view of an alternative embodiment of an exemplary PSER platform system 101 is shown. In UAV's 107 non-deployed state, the tether 169 is coiled around a fiber optic spool 153, replacing slip ring assembly (e.g., see 117, FIG. 1) and feed guide motor (e.g., see 111, FIG. 1), thereby reducing weight, as the fiber optic spool 153 weighs less than the slip ring assembly (e.g., see 117, FIG. 1) and feed guide motor (e.g., see 111, FIG. 1). Power converter/electrical distribution 151 within the second section 125 of the PSER platform system 101, which provides power to the base control system (e.g., see 300, FIG. 5), UAV 107, and UAV flight guidance control system (e.g., see 106, FIG. 3). In some embodiments, releasable couplers 126 may releasably couple retrievable section 125A to expendable section 125B.

Figure 3:
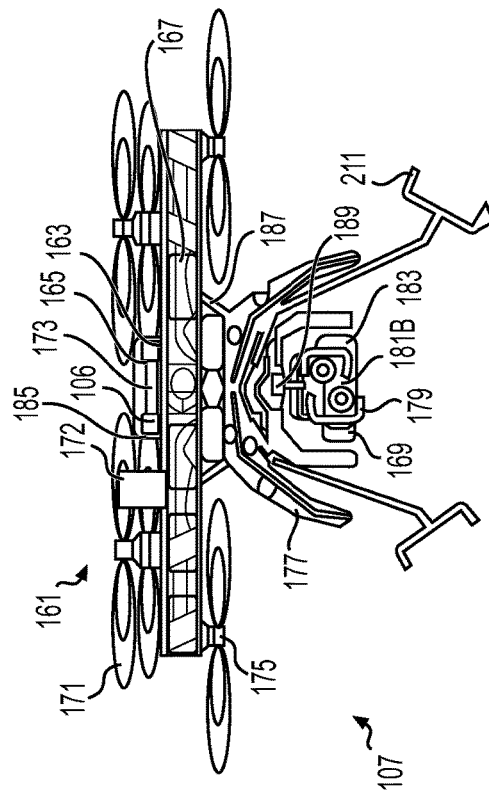
FIG. 3 shows an exemplary longitudinal view and partial cross section of an UAV such as in, e.g., FIG. 2, utilized in an exemplary embodiment.

Referring to FIG. 3, an exemplary longitudinal view and partial cross section of UAV 107 utilized in an exemplary embodiment is shown. UAV 107 comprising an airframe 167, a UAV propulsion system 161, a primary computer system 189, a communications system 163, a UAV controller 165, a photovoltaic power source 172, landing gear 177, a sensor system 187, and optional gripper 211.

In the preferred embodiment, the UAV propulsion system 161 is associated with airframe 167 and comprises propellers 171 coupled to electric motors 175, providing the lift necessary for the UAV 107 to maintain flight. During flight one or more landing gears 177 stabilize the UAV 107 and provide a structure for resting UAV 107 on a surface when not in flight. Propellers 171 may be about ten inches in length in this embodiment. Of course, propellers 171 may be longer or shorter than ten inches, depending on the implementation. The UAV 107, including electric motors 175, are powered by tether 169 when in a tethered state. However, UAV 107, including electric motors 175, can be powered by UAV auxiliary power source 173. The auxiliary power source 173 may be, for example, an electric battery, an engine that burns liquid fuel (e.g., internal combustion engine), or a photovoltaic power source 172 powered by laser light impulses from a laser (e.g., see 181A, FIG. 10). Auxiliary power source 173 may also be swappable to enable persistent flight of UAV 107. When auxiliary power source 173 is swappable, at least one other power source (e.g., tether 169) may be put in the place of auxiliary power source 173 while UAV 107 is using power.

The UAV primary computer system 189 is associated with one or more sensor systems 187 and communications systems 163 and comprises software 260, non-volatile memory 262, input/output ports 264, a computer system processor 213, GPS locator 212, and a controller 165.

Sensor system 187 is configured to generate information about the environment around and below UAV 107. Sensor system 187 may comprise of UAV camera 179, UAV laser 181B, and a gimbal stabilizer 183 to stabilize sensors, which are configured to generate information about the environment around UAV 107 or generating information for mortar team (e.g., see 401, FIG. 7) such as laser pointer lines (e.g., see 409, FIG. 8). UAV camera 179 can be, for example, a still image camera, a video camera, an infrared camera, or a multispectral camera, configured to take and record images or videos, including live feed video, and transmit images or videos to the soldier optic queuing system (e.g., see 251, FIG. 4). In addition, the sensor system 187 may carry Light Detection and Ranging (LIDAR) 201, sonar 204, and traffic collision avoidance system (TCAS) 206. Data collected by the sensor system 187 may be stored on the device collecting the data (e.g., the UAV camera 179 if that camera captured that data), or the data may be stored on non-volatile memory 262 of the UAV primary computer system 189.

The UAV 107 may use one or more communications systems 163, such as a communication subsystem or wired subsystem, configured to provide communications between UAV 107 and another device via wireless or wired methods. Communications systems 163 may comprises radio transceivers 202, infrared devices 208, optical ultrasonic and electromagnetic devices 210, and ports 220 such as Ethernet ports 220A, USB ports 220B, serial ports 220C, or other types of ports configured to establish a wired connection to the UAV 107 with other devices, such as a ground control station (GCS), flight planning system (FPS), or other devices, for example a mobile phone, tablet, personal computer, display monitor, other network-enabled devices. Communications system 163 can transmit a live video feeds to mortar teams (e.g., see 401, FIG. 7), signal them with UAV laser 181B in the field, as well as send SAT PHONE/COM info from radio transceivers 202. Additionally, the communications system 163 may optionally contain an RF signal source 185 emitted through the sensor system 187. One or more RF signals may be detectable by an payload, and or sensor systems.

Controller 165 associated with UAV primary computer system 189 may control operation of various systems within a UAV 107. Controller 165 may have a processor unit 230 and an autopilot feature 232 along with a desired level of intelligence to aid in the operation of UAV 107. Controller 165 may receive commands, tasks, or other types of information depending on the level of intelligence of controller 165. Further, controller 165 may operate UAV 107 using optional navigation software 234 in some embodiments.

Figure 4:
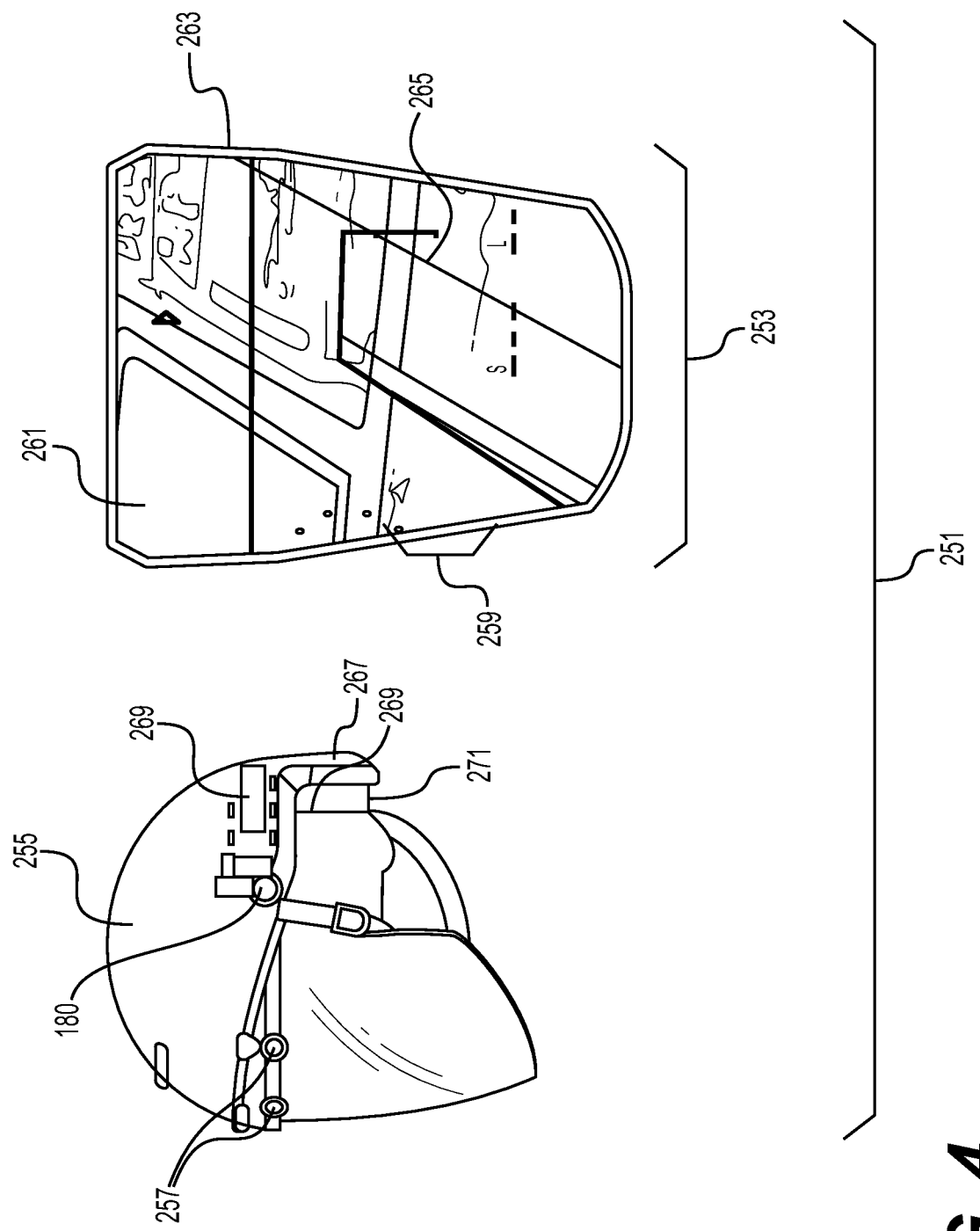
FIG. 4 shows an exemplary user optics viewing or queuing system equipment of an exemplary embodiment that displays video and data outputs from the UAV.

Referring to FIG. 4, an isometric view of a helmet 255 and a frontal view of a screen shield or display 253 of the soldier optics queuing system 251, which comprises a screen shield or display 253, helmet 255, camera 180, fan ventilator 267, battery pack 269, and USB connection 271. Screen shield or display 253 is coupled to helmet 255 via attachment lugs 257. The screen shield or display 253 displays navigational 259, status 261, targeting 263, and trajectory 265 data along with real-time images transmitted to screen shield or display 253 from camera 180. The screen shield or display can be a semi-transparent heads up display. Camera 180 can include thermal imaging camera, night vision, infrared, etc. In an alternative embodiment, camera 180 can be UAV camera (e.g., see 179, FIG. 3) located on UAV (e.g., see 107, FIG. 3). In other embodiments, helmet 255 can be replaced with any type of head mount that supports and orients solider optics queuing system 251 or configured to fit on a user's head. The head mount may include an elastic band, a strap, a hat or any configuration thereof suitable to position screen shield or display 253 in front of a user's face. In other embodiments, helmet 255 may include an augmented reality display incorporated by reference herein, U.S. Pat. No. 6,408,257 ("Harrington").

Figure 5:
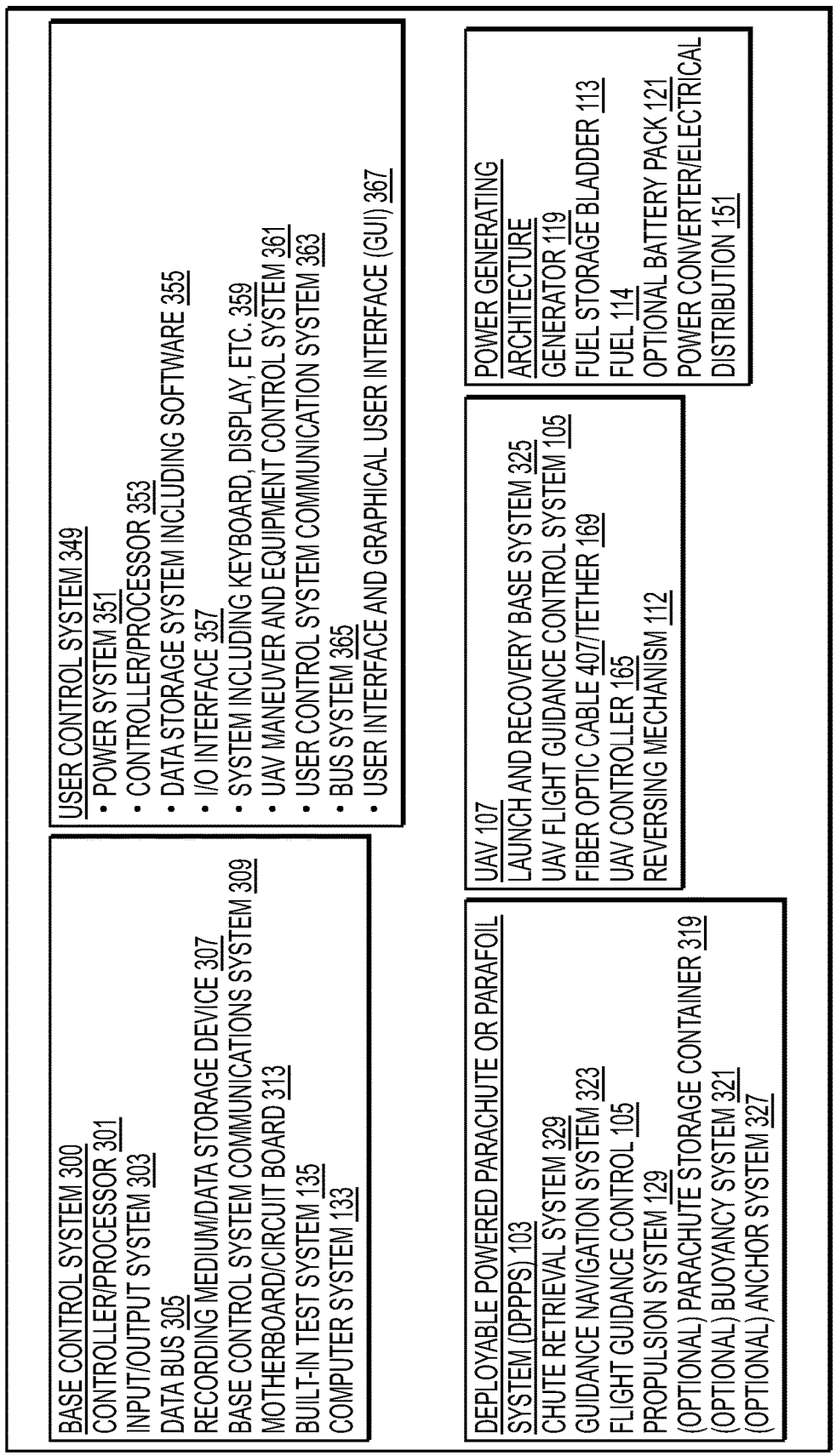
FIG. 5 shows a block diagram of an exemplary system architecture in accordance with exemplary embodiments of the present disclosure.

Referring to FIG. 5, a block diagram of architecture that is housed in PSER platform system 101 accordance with exemplary embodiments of the present disclosures illustrated. Exemplary embodiment includes software components, including base control system controller/processor 301, input/output system 303, data bus 305, base control system recording medium/data storage device 307, base control system motherboard/circuit board 313, communication system 309 (including satellite or SATCOM) and optical communication systems (not shown) (e.g., UAV laser (see 181B, FIGS. 3 and 181A, FIG. 10)). Built in Test system ("BIT Test") 135 is used to test and give integrity to computer system 133, including circuits, links, control servos, transmitter/receiver system and radiator/altimeter. Additionally, BIT Test 135 energizes propulsion system 129 via the generator 119 and establish satellite communications link. Computer system 133 (not shown) monitors the optional battery pack 121 and load levels operation of UAV 107, transmits telemetry data to mortar teams (e.g., see 401, FIG. 7), controls and transmits fiber optic communications through fiber optic cable e.g., see 407, FIG. 7) via tether 169 to UAV 107, and controls the launch of UAV 107.

DPPPS 103, including guidance navigation system 323, pulls on DPPPS cables (e.g., see 104, FIG. 6) to control DPPPS 103 and guide PSER platform system (e.g., see 101, FIG. 6) to target destination (e.g., see 381, FIG. 6) via flight guidance control system 105. At target destination (e.g., see 381, FIG. 6), DPPPS 103 is detached and optionally retrieve into parachute storage container 319 located in PSER platform system 101. If target destination (e.g., see 381, FIG. 6) is on water, expendable section 125B (e.g., see FIG. 1) may include a buoyancy system 321 allowing PSER platform system 101 to float in water, and be guided around the water via the UAV 107. An alternative embodiment may include an optional anchor system 327 which anchors PSER platform system 101 to the bottom of a body of water. Chute retrieval system 329 may be included in DPPPS 103 in some embodiments. Chute retrieval system 329 may be configured to pull detachable and reattachable cable (e see 131, FIG. 6), coupled to DPPPS 103, back into the PSER platform system 101. Chute retrieval system 329 may be coupled to generator 119 or any other element that provides power to the base control system 300 and configured to pull via and suitable mechanical device, such as a winch, tension mechanism, crank, or other known device.

Exemplary embodiment also includes generator 119, fuel storage bladder 113, fuel 114, optional battery pack 121, and power converter/electrical distribution 151, which provides power to the base control system 300, UAV 107, and flight guidance control system 105. In some embodiments, auxiliary power source, for example, solar panels may be disposed on PSER platform system 101, to recharge optional battery pack 121. Other embodiments may provide for fuel storage bladder 113 to include an opening such that it may be easily refueled (e.g., a mobile team refueling operation). In its non-deployed state, UAV 107 is coupled to UAV launch and recovery base system 325.

Further referring to FIG. 5, a block diagram of the software architecture in accordance with the user control system 349 in which the present disclosure can be implemented. User control system 349 comprises a power system 351, User control system controller/processor 353, bus system 365, and user control system data storage system 355 including software. Bus system 365 can be any suitable type of bus used in computing; whether parallel, bit series, or switched hubs connections and can include multidrop or daisy chain topology, or any other configuration known in the art. The user control system 349 can be connected via Input/output interfaces 357. The Input/output interfaces 357 can also include, for example, a serial port, a parallel port, a small computer system interface (SCSI), an infrared (IR) interface, a radio frequency (RF) interface, a universal serial bus (USB) interface, and the like. The I/O interfaces 357 can include a user interface and graphical user interface (GUI) 367 that enables a user to interact with mobile devices. Additionally, the I/O interfaces 357 may further include an imaging device, i.e. camera, video camera, etc.

The user control system 349 utilizes the User Interface and Graphical User Interface (GUI) System 367 including keyboard, display, etc. 359, UAV maneuver and Equipment Control System (e.g., joystick and/or flight control system) 361, and base control system communications system 363 to communicate with UAV 107 in flight or at UAV launch and recovery base system 325 when UAV 107 is grounded.

Referring to FIG. 6, navigation of PSER platform system 101 to target destination 381 is depicted. PSER platform system is coupled to DPPPS 103 via detachable and reattachable cable 131. After ejection from aircraft DPPPS 103 is deployed guiding PSER platform system 101 to target destination 381. Propulsion system (e.g., see 129, FIG. 1) and guidance navigation system (e.g., see 323, FIG. 5) aid in directing PSER platform system 101 to target destination 381. Guidance navigation system (e.g., see 323, FIG. 5) controls DPPPS cables 104, manipulating DPPPS 103 resulting in PSER platform system 101 being guided to target destination 381. An operator (e.g., mortar team 401, FIG. 7) can optionally take control of PSER platform system's 101 guidance navigation system (e.g., see 323, FIG. 5) via satellite communications link, such as with predator drones or localized control airship orbiting close by with high frequency (HF) remote control, to guide PSER platform system 101 to target destination 381.

Figure 7:
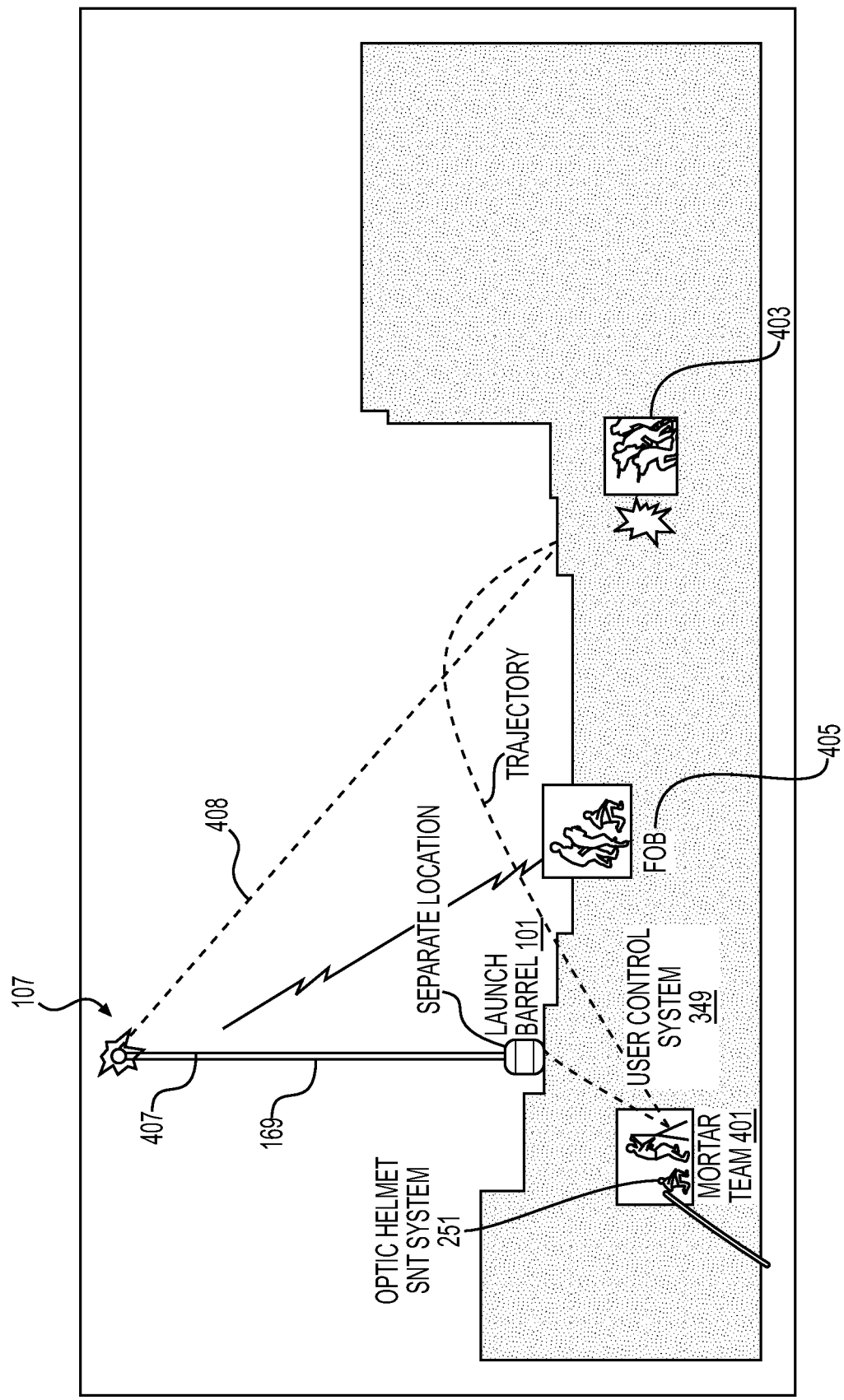
FIG. 7 shows an exemplary embodiment in accordance with this disclosure of an aerial surveillance system in an exemplary operational context.

Referring to FIG. 7, an exemplary field of operation is shown with mortar team 401 using UAV 107 to accurately pinpoint the location of a target area 403 and accurately and reliably conveying information on the target area 403 to the mortar teams 401 in a field of combat.

Here, UAV 107 deploys from PSER platform system 101, and conveys GPS data along with UAV camera (e.g., see 179, FIG. 3) transmissions to mortar team 401, where mortar team 401 monitors the target area 403 (e.g., monitoring enemy combatants) via exemplary soldier optics queuing system 251. Mortar team 401 controls UAV's 107 movements and UAV camera (e.g., see 179, FIG. 3) through use of user control system 349. Communication link from the user control system 349 to the UAV's primary computer system (e.g., see 189, FIG. 3) can be wireless or wired. When deploying the UAV 107 in the tethered state, communications and power is transmitted to UAV 107 via tether 169. Tether 169 may carry a fiber optic cable 407, ensuring no signal can be traced back to the location of PSER platform system 101. Additionally, in UAV's 107 untethered state, communication may be transmitted wirelessly and power delivered to UAV 107 via auxiliary power source (e.g., see 173, FIG. 3). In an alternative embodiment, laser light impulses from laser (e.g., see 181A, FIG. 10) interact with a photovoltaic power source (e.g., see 172, FIG. 3) to power UAV 107 and keep tether 169 from overheating.

The location of and the subsequent movement of combatants within the target area 403 are captured by UAV camera (e.g., see 179, FIG. 3) located on UAV 107, and transmitted to mortar team 401. Mortar team 401 can then quickly make correction in their next round of engagements on target. The system allows mortar team 401 to quickly eliminate or thwart unfriendly combatants within target area 403 and know whether to continue and assault or to evacuate the area to another firing location. Mortar teams 401 can also convey information about mortar success and combatant movement within target area 403 to allied infantry teams 405 who are closer to target area 403. Laser pointer lines 409 are created by mortar teams 401 on the ground or by UAV 107. These laser pointer lines 409 may be used in conjunction with UAV camera (e.g., see 179, FIG. 3) to produce images such as FIGS. 8 and 9.

Figure 8:
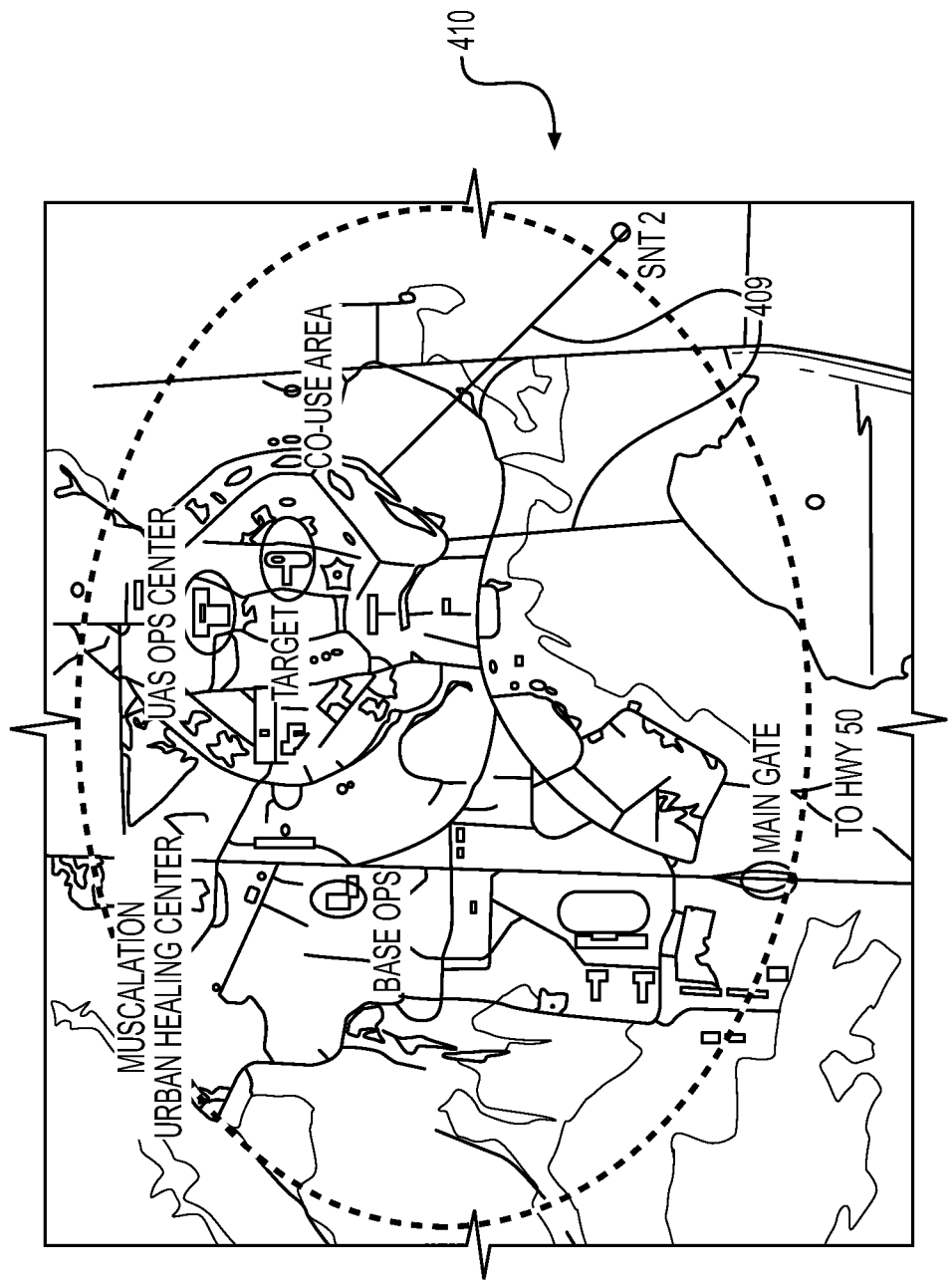
FIG. 8 shows an aerial map view used in accordance with the exemplary surveillance system enabled by the present disclosure.

Referring to FIG. 8, a GPS map 410 captured by camera (e.g., see 180, FIG. 4) is shown allowing an operator (e.g., mortar team 401, FIG. 7) to discern target areas. Laser pointer lines 409 are created by mortar team (e.g., see 401, FIG. 7) on the ground or by UAV laser (e.g., see 181B, FIG. 3) on UAV (e.g., see 107, FIG. 3).

Figure 9:
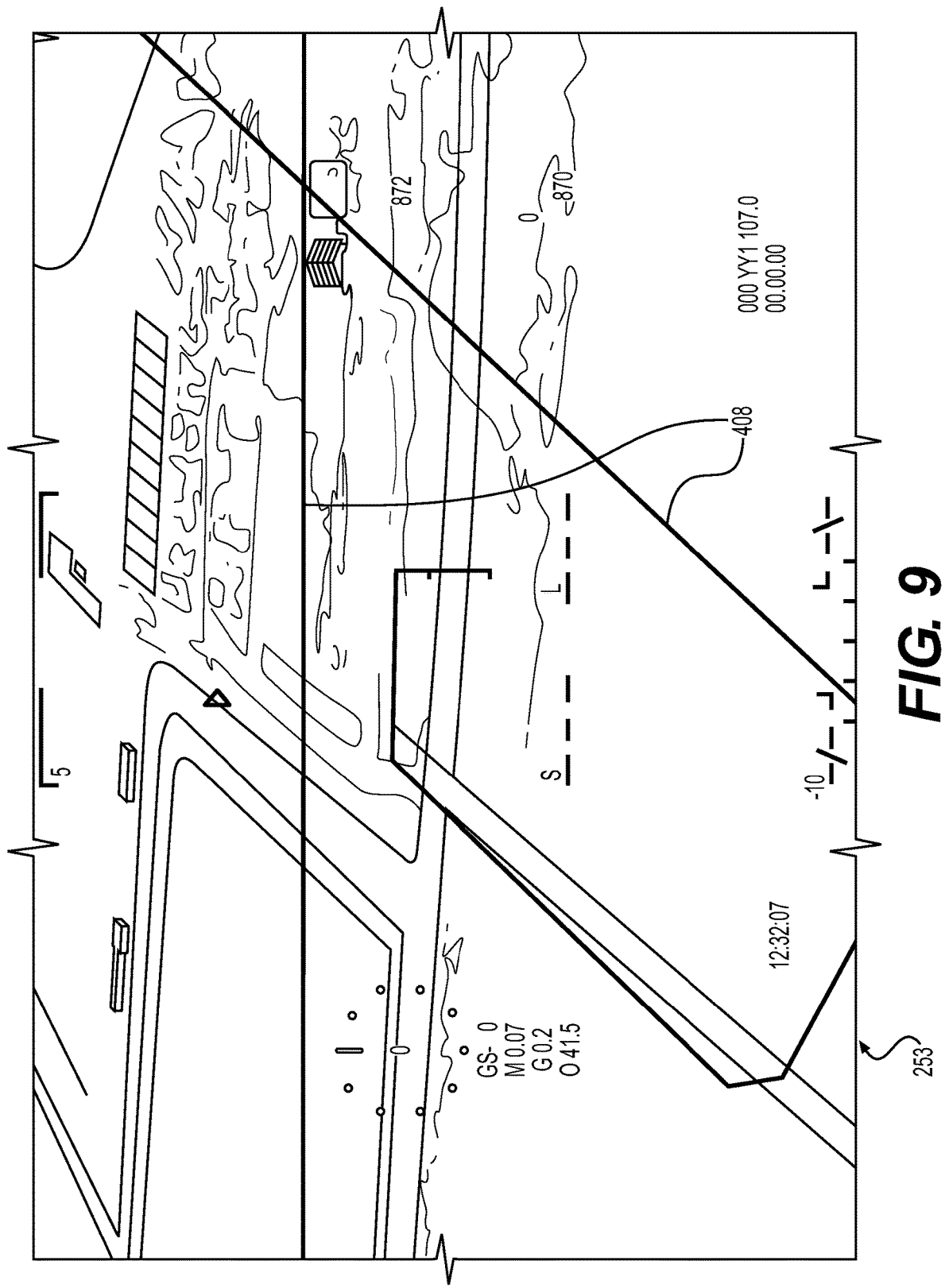
FIG. 9 shows a screen shield view of a user video and data display system.

Referring to FIG. 9, an example of a screen shield or display 253 view is depicted. Laser pointer lines 409 are created by laser (e.g., see laser 181A, FIG. 10) or UAV laser (e.g., see 181B, FIG. 3) is shown.

Figure 10:
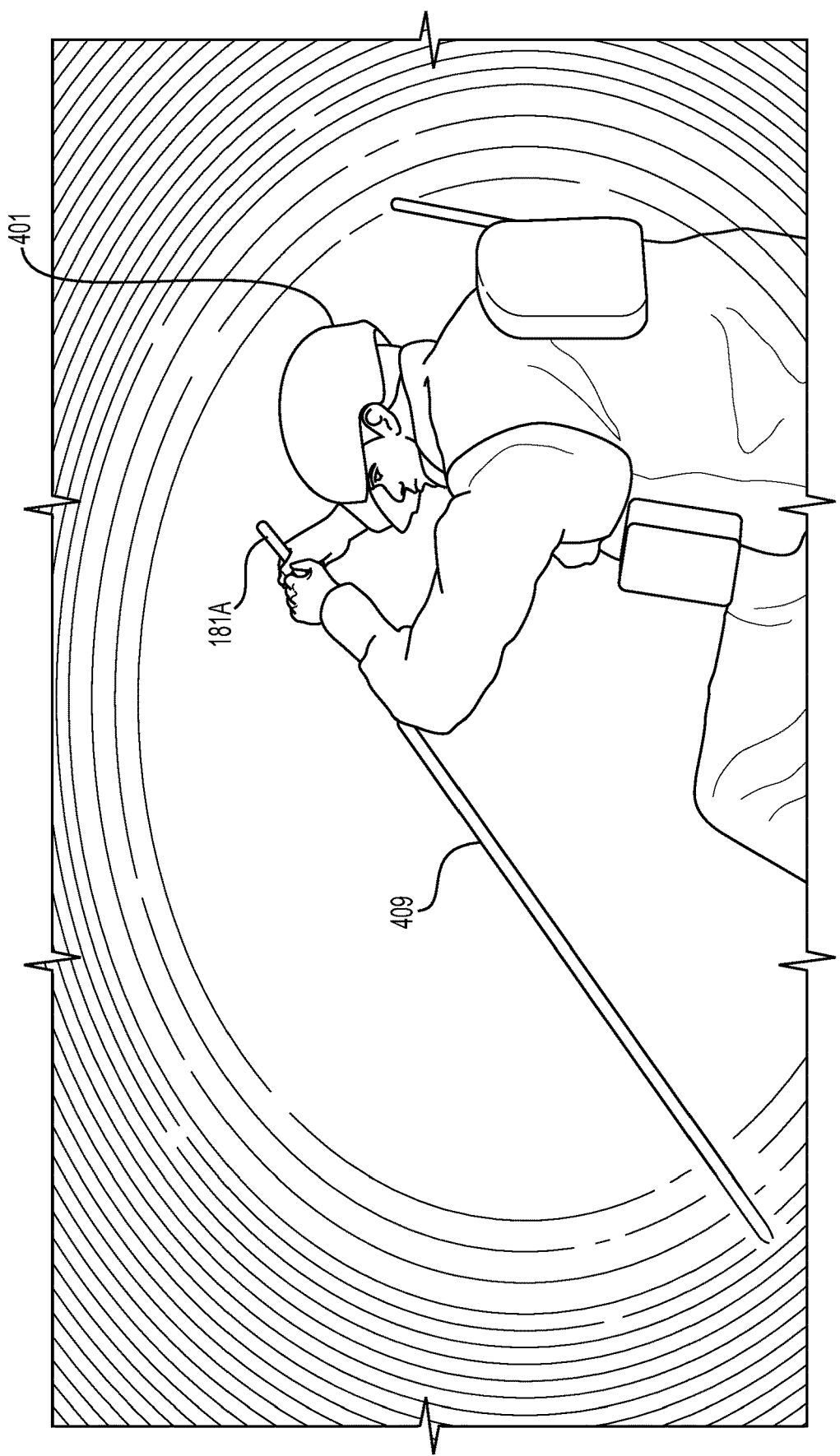
FIG. 10 shows an example of laser spotting system used in relation one exemplary embodiment which would be viewable by optical systems on an exemplary UAV viewing an area which can be used as an aid in targeting.

Referring to FIG. 10, exemplary use of laser 181A by mortar team 401 is shown. When mortar team 401 operates laser 181A, laser pointer line 409 are created. Laser pointer line 409 may be used in conjunction with camera (e.g., see 180, FIG. 4) to produce images from FIGS. 8 and 9.

Figure 11A:
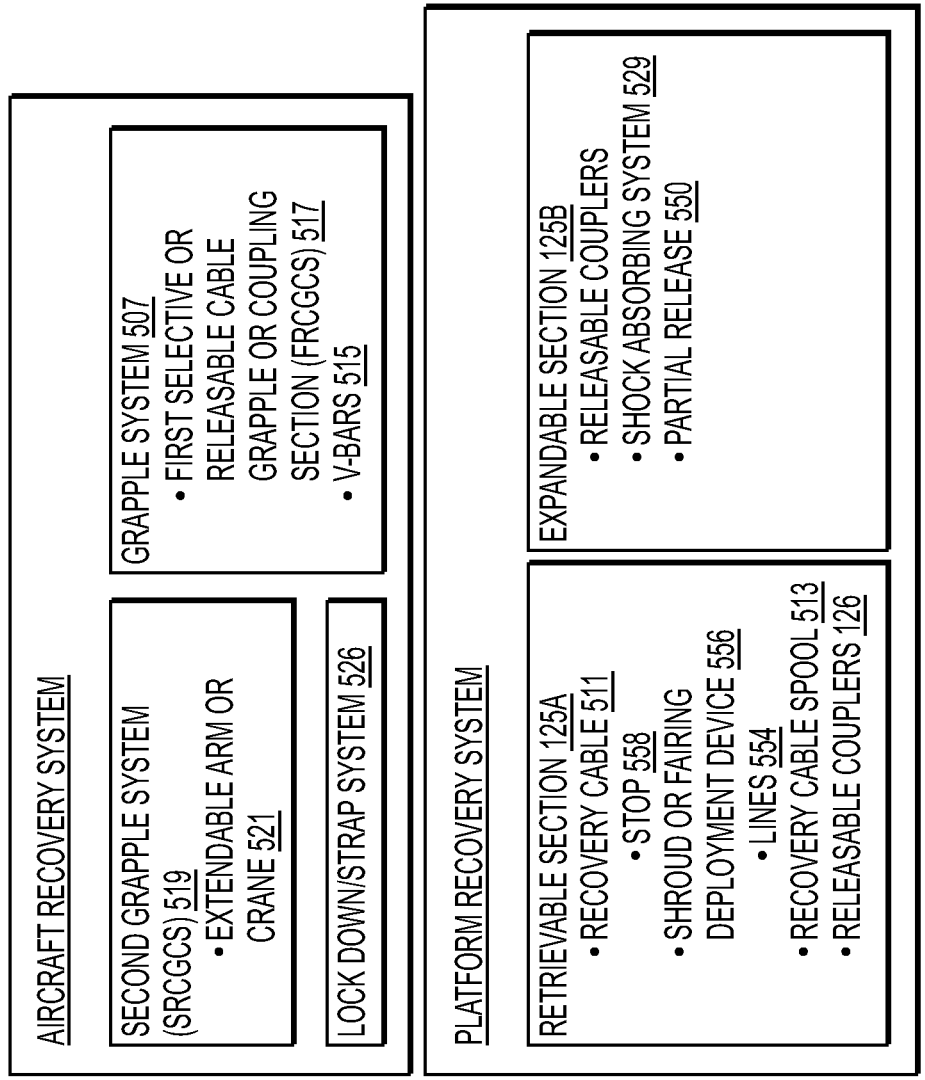
FIGS. 11A and 11B shows an exemplary base station/UAV recovery system and system architecture of an exemplary PSER platform in accordance with one exemplary embodiment.
Figure 11B:
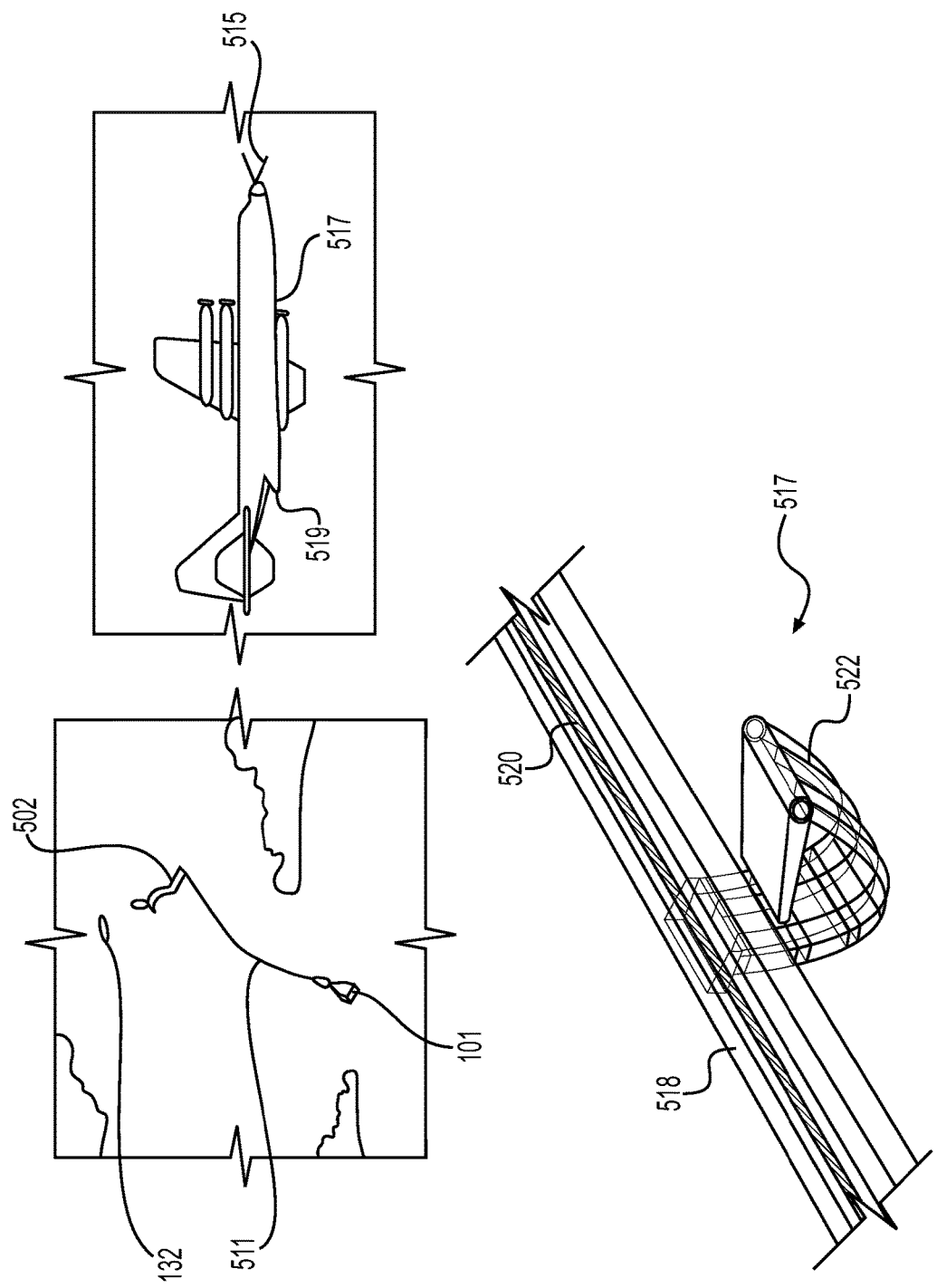

Referring to FIG. 11A and FIG. 11B, a functional diagram of the complementary components mounted on aircraft 502 is shown that includes an exemplary system can include a selective cable grapple system 507 comprising v-bars 515 and first selective or releasable cable grapple or coupling section (FRCGCS) 517 (e.g., shuttle track cargo rail/movement system), that is adapted to grapple a recovery cable 511 attached to a deployed recovery device 132 attaching the recovery cable 511 between the recovery device 132 and the PSER platform system 101. Some embodiments of the FRCGCS 517 comprise a track 518 that runs along a bottom of the aircraft 502 from front to back (e.g., edge of extendable rear cargo ramp). A grapple cable 520 may be disposed on the track 518 in such a manner that the grapple cable 520 may move freely along the length of the track 518. A cable shuttle 522 may be attached to the grapple cable 520 so that it may move with the grapple cable 520 along the length of the track 518. In some embodiments, the cable shuttle 522 is configured to receive the recovery cable 511 after the recovery cable 511 has contacted the v-bars 515. The cable shuttle 522 may then be configured to grasp a portion of the recovery cable 511 that is disposed in the cable shuttle 522 such that the portion of the recovery cable 511 moves with the cable shuttle 522. After grasping the recovery cable 511, the cable shuttle 522 may be configured to move towards the back of the aircraft 502. The recovery device 132 can include a balloon, collapsible kite, parafoil system, or any device that upon deployment gains and/or maintains an altitude. The recovery device 132 is compactly stored on the PSER platform system 101 and when deployed extends the recovery cable 511 from a recovery cable spool 513. The releasable couplers 126 may disengage when recovery device 132 is deployed allowing for retrievable section 125A to move freely in relation to expendable section 125B. The releasable couplers 126 may comprise any suitable configuration such that the couplers can be selectively detached, including, but not limited to adhesive, mechanical fasteners, fabric hook and look fasteners, electronically controlled latch, or any other method known in the art.

The v-bars 515 can be a V or Y shaped system that guides the recovery cable 511 into the FRCGCS 517. The v-bars may be positioned at the front of the aircraft 502 and configured to selectively cut the PSER platform system's 101 recovery device 132 loose so recovery device 132 flies up and over the aircraft 502 while FRCGCS 517 maintains coupling with the recovery cable 511 after it has been grappled/snagged by aircraft 502. The PSER platform system 101 could be pulled underneath and behind the aircraft 502. In some embodiments, recovery cable 511 may be attached to retrievable section 125A such that when the recovery cable is grappled/snagged by aircraft 502, retrievable section 125A is pulled up with the aircraft 502, while expendable section 125B remains on the ground/water.

One variant can include an assembly where the recovery cable spool 513 can be the same device as (e.g., see 117, FIG. 1 and e.g., see 153, FIG. 2) that is coupled with the UAV (e.g., see 107, FIG. 1). If the same device (e.g., see 117, FIG. 1 and e.g., see 153, FIG. 2) is used with the UAV (e.g., see 107, FIG. 1) then a decoupler mechanism 525 (not shown) is provided in PSER platform system 101 that detaches tether (e.g., see 169, FIG. 1) from the UAV (e.g., see 107, FIG. 1) and couples it with the recovery device 132.

A second selective or releasable cable grapple system (SRCGCS) 519 can be disposed or mounted in the aircraft 502 and may be configured so that the aircraft 502, after flying and grappling recovery cable 511 and pulling the PSER platform system 101 off the ground, would grab or couple with the recovery cable 511 in proximity with the rear of the aircraft/ramp and reel the PSER platform system 101 into the aircraft 502 (e.g., C130 rear cargo hatch/ramp). In some embodiments, the SRCGCS 519 may be coupled to the ramp and can comprise an extendable arm or crane 521 configured to reach out and snag the recovery cable 511 which is being dragged under the aircraft 502 in proximity to the ramp/hatch and then pull the recovery cable 511 and therefore the PSER platform system 101 up to and onto the aircraft 502. Extendable arm or crane 521 may be manually operated by a user. A lock down/strap down system 526 can then be used to attach the recovered PSER platform system 101 to the aircraft 502.

In some embodiments the FRCGCS 517 may be configured to traverse backwards and pull the PSER platform system 101 towards the back of the aircraft 502 where the PSER platform system 101 is then lifted via SRCGCS 519 and moved into the airplane 502. For example, the PSER platform system 101 may be moved into the rear cargo hold of aircraft 502. FRCGCS 517 can then be moved back into grappling position to grab a second PSER platform system (not shown).

Embodiments can include a variant which has a shock absorbing system 529 is disposed on PSER platform system 101. The shock absorbing system 529 may be included in the retrievable section 125A, or in alternate embodiments, it may be included in expendable section 125B, as shown in FIG. 11A.

A variant can also have a partial release 550 (e.g., quick release) of elements of the PSER platform system 101 such as the optional battery pack (e.g., see 121, FIG. 1), which lightens the overall PSER platform system's 101 weight and therefore reduces the load on the recovery cable 511.

An embodiment can include an inflatable or extendable/retracted aerodynamic shroud or fairing 552 (not shown) which creates a streamlined shape of the PSER platform system 101, which can be deployed or extended when the recovery cable 511 is deployed via recovery device 132. This inflatable or extendable/retracted aerodynamic shroud or fairing 552 can be coupled to the recovery cable 511 with lines 554 attached to the recovery cable 511 via a shroud or fairing deployment device 556 (e.g., a coupling ring) so that when the recovery device 132 deploys the recovery cable 511 passes through the shroud or fairing deployment device 556 until the recovery cable 511 is nearly fully extended and a stop 558 on the recovery cable 511 then pulls the shroud or fairing deployment device 556 up and extends the inflatable or extendable/retracted aerodynamic shroud or fairing 552 (not shown) around the PSER platform system 101 via the shroud or fairing deployment device 556 when the stop 558 on the recovery cable 511 extends to its fully extended position. The lines 554 can be routed so that they do not catch or tangle with other equipment on the PSER platform system 101.

Another variant can include a drag chute 562 (not shown) which is deployed after the PSER platform system 101 is airborne so that it applies a requisite degree of force on the PSER platform system 101 to bring it closer to the back end of the aircraft 502 so that the PSER platform system 101 is within selective cable grapple system's 507 range.

Figure 12A:
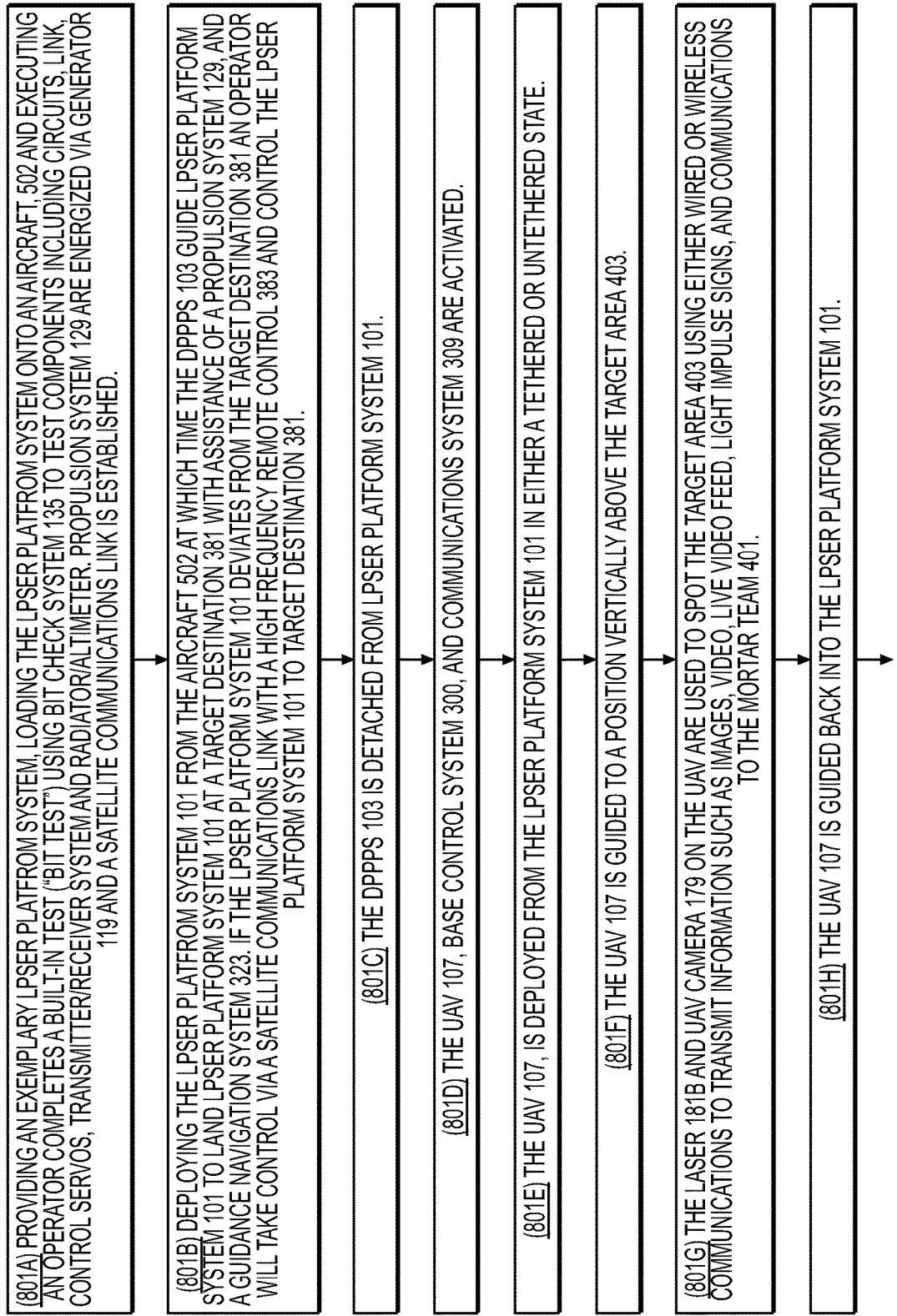
FIGS. 12A and 12B shows a method of operating an exemplary embodiment of present disclosure.

Referring to FIG. 12A, the present disclosure provides a method of use of an exemplary UAV 107 with PSER platform system 101. At step 801A, an operator completes a built-in test ("BIT Test") using BIT Test check system 135 to test components including circuits, link, control servos, transmitter/receiver system and radiator/altimeter. Propulsion system 129 are energized via generator 119 and a satellite communications link is established.

At step 801B, the PSER platform system 101 is deployed from an aircraft 502 at which time the DPPPS 103 guide PSER platform system 101 to land PSER platform system 101 at a target destination 381 with assistance of a propulsion system 129, and a guidance navigation system 323. If the PSER platform system 101 deviates from the target destination 381 an operator will take control via a satellite communications link with a high frequency remote control 383 and control the PSER platform system 101 to target destination 381.

At step 801C the DPPPS 103 is detached from PSER platform system 101. At step 801D the UAV 107, base control system 300, and communications system 309 are activated. At step 801E, the UAV 107 is deployed from the PSER platform system 101 in either a tethered or untethered state. At step 801F, the UAV 107 is guided to a position vertically above the target area 403. At step 801G, the UAV laser 181B and UAV camera 179 on the UAV are used to spot the target area 403 using either wired or wireless communications to transmit information such as images, video, live video feed, light impulse signs, and communications to the mortar team 401.

At step 801H, the UAV 107 is guided back into the PSER platform system 101.

Figure 12B:
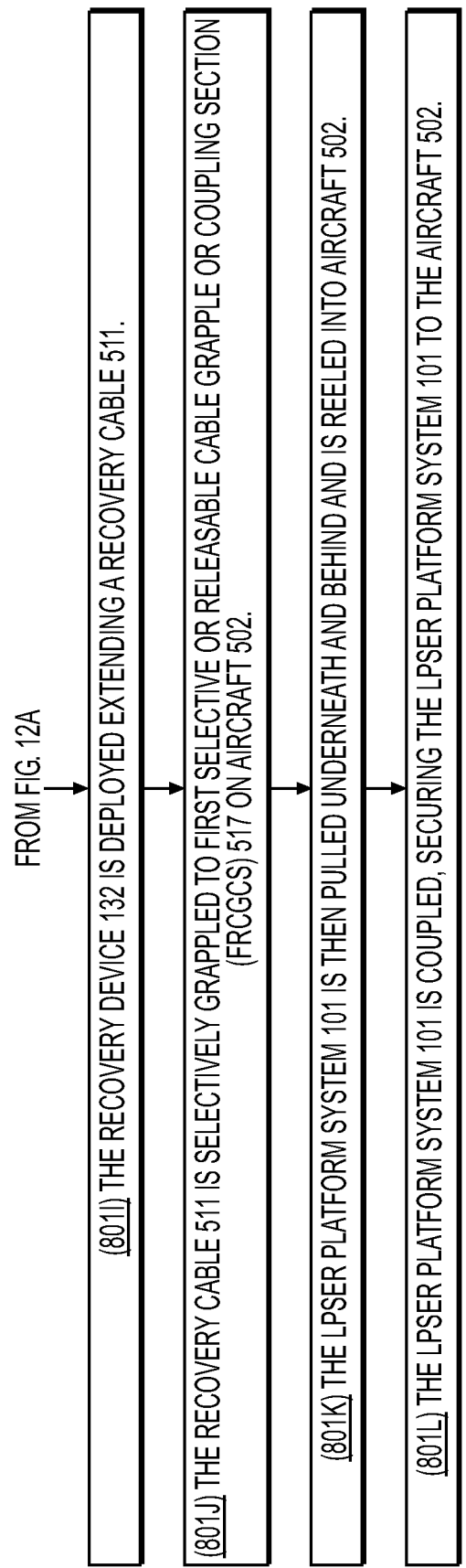

Referring to FIG. 12B, at step 801I, the recovery device 132 is deployed extending a recovery cable 511. At step, 801J, the recovery cable 511 is selectively grappled to PSERFirst Selective or Releasable Cable Grapple or Coupling Section (FRCGCS) 517 on aircraft 502. At step 801K, the PSER platform system 101 is then pulled underneath and behind and is reeled into aircraft 502. At step 801L, the PSER platform system 101 is coupled, securing the PSER platform system 101 to the aircraft 502.

Although the disclosure has been described in detail with reference to certain preferred embodiments, variations and modifications exist within the spirit and scope of the disclosures described and defined in the following claims.

The invention claimed is:

1. A persistent surveillance and launch/recovery system comprising:
an aerial vehicle (AV) comprising:
an airframe;
a propulsion system coupled to said airframe that comprises at least one propeller configured to provide lift for said AV to maintain flight;
at least one electric motor coupled to the at least one propeller;
a flight control system configured to orient and control the at least one propeller or fan system based on flight control inputs;
at least one landing gear structure adapted to support the AV in a stable configuration when landing;
an electrical power system coupled to said airframe that comprises at least one power input that provides power to said electric motor;
a guidance, flight instrumentation, and navigation system comprising a controller, memory, altimeter, geospatial position sensor, machine instructions for controlling the flight control system;
a sensor system coupled to said airframe that comprises:
at least one camera;
a camera position control system to orient the camera field of view in a direction based on position control commands;
one or more AV lasers; and
at least one gimbal stabilizer, wherein the gimbal stabilizer is coupled to said camera and said camera is configured to record images and transmit said images to a heads-up display; and
a computer system coupled to said airframe;
one or more communications systems, wherein the communications system is configured to provide communications between said AV and at least some of its onboard systems and a ground station, wherein the computer system comprises a controller configured to receive control inputs for the AV to control one or more onboard systems from the ground station and update or execute machine readable instructions stored on at least the computer system;
a deployable operating platform system comprising:
a first module;
a second module coupled to the first module on or adjacent to a first side of the second module, the second module comprising:
a second module control system mounted on or within the second module, the second module control system further includes at least one I/O interface and a controller or processor, a communication system, and a data storage system;
a power system comprising a plurality of electrical power storage cells and a power transfer system comprising a tether coupled to the AV system that delivers power from the plurality of electrical power storage cells to the AV upon demand; and
wherein said second module comprises a launch and recovery base station, a tether, and a slip ring assembly, wherein said AV rests on said launch and recovery base station, wherein said AV is coupled to an end of said tether, and a second portion of said tether is coiled around a rotation mechanism, wherein said rotation mechanism comprises a feed guide motor, wherein said feed guide motor is coupled to and rotates said rotation mechanism allowing said tether to be wound or unwound from said rotation mechanism.

2. The persistent surveillance and launch/recovery system of claim 1, wherein the rotation mechanism is the slip ring assembly.

3. The persistent surveillance and launch/recovery system of claim 1, wherein the rotation mechanism is a fiber optic spool.

4. The persistent surveillance and launch/recovery system of claim 1, wherein the power system further comprises a generator, wherein the generator is selectively coupled to a portion of the tether to provide power to the AV.

5. The persistent surveillance and launch/recovery system of claim 1, wherein the electrical power system comprises a plurality of solar panels.

6. The persistent surveillance and launch/recovery system of claim 1, wherein said tether uses a laser light impulses and a photovoltaic system on said AV to power the AV and prevent said tether from overheating.

7. The persistent surveillance and launch/recovery system of claim 1, wherein said tether transmits fiber optic communication though a fiber optic link, wherein said fiber optic communications controls the launch and control of said AV.

8. The persistent surveillance and launch/recovery system of claim 1, wherein said energy source is swappable and at least one other energy source can be used in place of said energy source when said AV is using power.

9. The persistent surveillance and launch/recovery system of claim 1, wherein said camera is selected from a group consisting of a still image camera, a video camera, an infrared camera, a night vision camera and a multispectral camera.

10. The persistent surveillance and launch/recovery system of claim 1, wherein said AV further comprises a secondary computer system.

11. The persistent surveillance and launch/recovery system of claim 1, wherein said AV further comprises a plurality of devices comprising LIDAR, radio transceivers, sonar, or traffic collision avoidance systems, wherein data collected by said plurality of devices is stored on said device collecting the data or in said non-volatile memory of said AV's said primary computer system.

12. The persistent surveillance and launch/recovery system of claim 1, wherein said communications system further comprises a plurality of ports to establish a wired connection from said AV to a separate device, wherein said separate device is configured to provide communications from said AV to said separate device.

13. The persistent surveillance and launch/recovery system of claim 1, wherein said communications between said AV and said separate device is wireless.

14. The persistent surveillance and launch/recovery system of claim 1, wherein said AV further comprises a radio frequency signal source, wherein said radio frequency signal source emits through at least one antenna and detectable by an incoming mobile object, wherein said mobile object comprises guidance, propulsion, payload, and sensor systems.

15. The method of claim 14, further comprising a parachute or parafoil retrieval system, wherein once at said designated landing point said parachute or parafoil system is detached, said parachute or parafoil system retrieves said parachute or parafoil system in a parachute storage container.

16. The method of claim 14, wherein said AV control systems are controlled via wireless communications.

17. The method of claim 14, wherein said recovery device is a balloon, collapsible kite, or parafoil system.

18. The persistent surveillance and launch/recovery system of claim 1, wherein said AV can be untethered from said persistent surveillance and launch/recovery system, wherein said AV further comprises a GPS locator configured to create a line of sight for corrections in firing solution range and GPS data acquisition.

19. The persistent surveillance and launch/recovery system of claim 1, wherein said AV further comprises grippers.

20. The persistent surveillance and launch/recovery system of claim 1, wherein said I/O interfaces includes a graphical user interface enabling a user to interact with said separate devices, wherein said graphical user interface includes a keyboard and display, AV maneuver and equipment control system, and a GUI communications system, wherein said GUI communications systems is configured to communicate with said AV in flight or said launch and recovery base station when said AV is grounded.

21. A persistent surveillance and launch/recovery system comprising:
an aerial vehicle (AV) comprising:
an airframe;
a propulsion system coupled to said airframe that comprises at least one propeller or fan system configured to provide lift for said AV to maintain flight;
at least one electric motor coupled to the at least one propeller;
a flight control system configured to orient and control the at least one propeller or fan system based on flight control inputs;
at least one landing gear structure adapted to support the AV in a stable configuration when landing;
an electrical power system coupled to said airframe that comprises at least one power input that provides power to said at least one electric motor;
a guidance, flight instrumentation, and navigation system comprising a controller, memory, altimeter, geospatial position sensor, machine instructions for controlling the flight control system;
a sensor system coupled to said airframe that comprises:
at least one camera;
a camera position control system to orient the at least one camera's field of view in a direction based on position control commands;
one or more AV lasers; and
at least one gimbal stabilizer, wherein the at least one gimbal stabilizer is coupled to said at least one camera and wherein said at least one camera is configured to record images and transmit said images to a heads-up display;
a computer system coupled to said airframe;
one or more communications systems comprising at least one of the following: a radio transceiver, an infrared communication device, an optical ultrasonic communication device, or an electromagnetic spectrum communication device, wherein the communications system is configured to provide communications between said AV and at least some of its onboard systems and a ground station, wherein the computer system comprises a controller configured to receive manual control inputs for the AV to control one or more onboard systems from the ground station and update or execute machine readable instructions stored on at least the computer system;
a deployable operating platform system comprising:
a first module wherein the first module is coupled to a second module and comprises a deployable powered parachute system with a detachable cable extending from said deployable powered parachute system to a first surface of said second module, wherein said deployable powered parachute system includes a guidance navigation system that adjusts said deployable powered parachute system to guide the deployable operating platform system to a user designated target destination;
the second module coupled to the first module on or adjacent to a first side of the second module, the second module comprising:
an AV bay or enclosure opening on the first side adapted to receive, hold, and store or launch the AV, the AV bay or enclosure further comprising a door actuator configured to open or close retractable doors, the AV bay or enclosure further comprising an AV retainer configured to selectively prevent the AV from moving within the AV bay or enclosure while the deployable operating platform is in motion;
a second module landing structure coupled to or adjacent to a second side of the second module opposing the first side;
a second module control system mounted on or within the second module, the second module control system further includes at least one I/O interface and a controller or processor, a data transfer system, and a data storage system, the second module control system and data transfer system coupled with the door actuator and the AV retainer;
a power system comprising a plurality of electrical power storage cells and a power transfer system comprising a retractable power cable coupled to the AV system that delivers power from the plurality of electrical power storage cells to the AV on demand;
the second module further comprising a concealment and security system, wherein said concealment and security system comprises a security monitor and security camera in communication with the controller or processor and data transfer system, wherein the concealment and security system further comprises at least one cover configured to deploy to overlay one or more sides of the deployable operating platform;

a recovery system, wherein said recovery system is coupled to said second module, wherein the recovery system comprises a deployed recovery device configured to elevate from the deployable operating platform system to an altitude where the recovery system is accessible by an aircraft, wherein the deployed recovery device is connected to the platform system by a recovery cable;

a launch and recovery base station, a tether, and a slip ring assembly, wherein said AV rests on said launch and recovery base station, wherein said AV is selectively coupled to the power system via said tether, wherein said AV is coupled to an end of said tether, and a second portion of said tether is coiled around the slip ring assembly, wherein said slip ring assembly comprises a feed guide motor, wherein said feed guide motor is coupled to and rotates said slip ring assembly allowing said tether to be wound or unwound from said slip ring assembly;

an energy source, wherein said energy source is a generator having a fuel storage bladder, wherein said energy source is in communication with said power system and selectively coupled to said second portion of said tether allowing power to flow from said energy source to said AV;

a ground station comprising:
a heads-up display and controller configured to operate the AV, the heads-up display comprising;
a head mount;
a power system comprised of a battery pack, an input/output port, a communication cable and a thermal camera;
a cooling system comprised of a fan ventilator;
a semi-transparent display system mounted to the head mount and disposed in a viewing position, wherein said display is configured as to show a plurality of data and images from the camera and sensors on the AV;

an aircraft comprising:
a first grapple system, wherein the first grapple system comprises;
a first selective grapple, wherein the first selective grapple is coupled to the bottom of the aircraft and comprises a track, and a cable shuttle configured to grip the recovery cable and traverse the length of the airplane via a grapple cable disposed on the track and coupled to the cable shuttle; and
v-bars, wherein the v-bars are disposed on the front of the aircraft and configured to collect the recovery cable and direct the recovery cable to the first selective grapple;
a second grapple system, wherein the second grapple system is mounted at the rear of the aircraft and comprising an extendable arm configured to grasp recovery cable from the first selective grapple and pull the recovery cable along with the deployable operating platform system into the aircraft; and
a recovery bay disposed within the aircraft and configured to receive the deployable operating platform system, wherein said recovery bay comprises a strap system and wherein the strap system is configured to affix the deployable operating platform system to the recovery bay after retrieval.

22. The persistent surveillance and launch/recovery system of claim 1, wherein a drivetrain and wheels are coupled with the bottom of the second module, wherein said drivetrain and wheels are configured to be guided around personnel off-site via a remote connection.

23. The persistent surveillance and launch/recovery system of claim 22, wherein a fiber optic cable is coupled to said tether and connects the AV to said energy source and said computer system, wherein slack in said fiber optic cable and said tether is held on the fiber optic spool and the feed guide motor is configured to keep tension on said tether and is rewindable.

24. The persistent surveillance and launch/recovery system of claim 1, wherein said landing system comprises an impact portion configured to safely disperse the force and lessen the impact of landing on hard surfaces.

25. The persistent surveillance and launch/recovery system of claim 1, wherein said lading system comprises a buoyancy system that is configured to allow the apparatus to float in water, wherein said AV is deployed and configured to guide the platform system around the water.

26. The landing system of claim 5, further comprising an anchor system anchoring said apparatus to a bottom of a body of water.

27. A method of using a persistent surveillance and launch/recovery system comprising:
providing an aerial vehicle (AV) comprising:
an airframe;
a propulsion system coupled to said airframe that comprises at least one propeller or fan system configured to provide lift for said AV to maintain flight;
at least one electric motor coupled to the at least one propeller;
a flight control system configured to orient and control the at least one propeller or fan system based on flight control inputs;
at least one landing gear structure adapted to support the AV in a stable configuration when landing;
an electrical power system coupled to said airframe that comprises at least one power input that provides power to said at least one electric motor;
a guidance, flight instrumentation, and navigation system comprising a controller, memory, altimeter, geospatial position sensor, machine instructions for controlling the flight control system;
a sensor system coupled to said airframe that comprises:
at least one camera;
a camera position control system to orient the at least one camera's field of view in a direction based on position control commands;
and
at least one gimbal stabilizer, wherein the at least one gimbal stabilizer is coupled to said at least one camera and wherein said at least one camera is configured to record images and transmit said images to a heads-up display;
a computer system coupled to said airframe;
one or more communications systems comprising at least one of the following: a radio transceiver, an infrared communication device, an optical ultrasonic communication device, or an electromagnetic spectrum communication device, wherein the communications system is configured to provide communications between said AV and at least some of its onboard systems and a ground station, wherein the computer system comprises a controller configured to receive manual control inputs for the AV to control one or more onboard systems from the ground station and update or execute machine readable instructions stored on at least the computer system;

providing a deployable operating platform system comprising:
- a first module wherein the first module is coupled to the second module and comprises a deployable powered parachute system with a detachable cable extending from said deployable powered parachute system to a first surface of said second module, wherein said deployable powered parachute system includes a guidance navigation system that adjusts said deployable powered parachute system to guide the deployable operating platform system to a user designated target destination;
- a second module coupled to the first module on or adjacent to a first side of the second module, the second module comprising:
  - an AV bay or enclosure opening on the first side adapted to receive, hold, and store or launch the AV, the AV bay or enclosure further comprising a door actuator configured to open or close retractable doors, the AV bay or enclosure further comprising an AV retainer configured to selectively prevent the AV from moving within the AV bay or enclosure while the deployable operating platform is in motion;
  - a second module landing structure coupled to or adjacent to a second side of the second module opposing the first side;
  - a second module control system mounted on or within the second module, the second module control system further includes at least one I/O interface and a controller or processor, a data transfer system, and a data storage system, the second module control system and data transfer system coupled with the door actuator and the AV retainer;
  - a power system comprising a plurality of electrical power storage cells and a power transfer system comprising a retractable power cable coupled to the AV system that delivers power from the plurality of electrical power storage cells to the AV on demand;
  - a data transfer system, and data storage system, the second module further comprising a concealment and security system, wherein said concealment and security system comprises a security monitor and security camera in communication with the controller or processor and data transfer system, wherein the concealment and security system further comprises at least one cover configured to deploy to overlay one or more sides of the deployable operating platform;
  - a recovery system, wherein said recovery system is coupled to said second module, wherein the recovery system comprises a deployed recovery device configured to elevate from the deployable operating platform system to an altitude where it is accessible by an aircraft, wherein the deployed recovery device is connected to the platform system by a recovery cable;
  - a launch and recovery base station, a tether, and a slip ring assembly, wherein said AV rests on said launch and recovery base station, wherein said AV is selectively coupled to the power system via said tether, wherein said AV is coupled to an end of said tether, and a second portion of said tether is coiled around the slip ring assembly, wherein said slip ring assembly comprises a feed guide motor, wherein said feed guide motor is coupled to and rotates said slip ring assembly allowing said tether to be wound or unwound from said slip ring assembly;
  - an energy source, wherein said energy source is a generator having a fuel storage bladder, wherein said energy source is in communication with said power system and selectively coupled to said second portion of said tether allowing power to flow from said energy source to said AV;

providing a ground station comprising:
- a heads-up display and controller configured to manually operate the AV, the heads-up display comprising;
- a head mount configured to be worn on a user's head;
- a power system comprised of a battery pack, an input/output port, a communication cable and a thermal camera;
- a cooling system comprised of a fan ventilator;
- a semi-transparent display system mounted to the head mount and disposed in a viewing position in front of a field of view of a user of the head mount, wherein said display is configured as to show a plurality of data and images from the camera and sensors on the AV;
- a laser, wherein the laser is configured to be operated by a user and configured to communicate with the AV to locate targets as well as allow the operator to orient the AV by observing the laser through the heads-up display; and providing an aircraft comprising:
- a first grapple system, wherein the first grapple system comprises;
  - a first selective grapple, wherein the first selective grapple is coupled to the bottom of the aircraft and comprises a track, and a cable shuttle configured to grip the recovery cable and traverse the length of the airplane via a grapple cable disposed on the track and coupled to the cable shuttle; and
  - v-bars, wherein the v-bars are disposed on the front of the aircraft and configured to collect the recovery cable and direct the recovery cable to the first selective grapple;
- a second grapple system, wherein the second grapple system is mounted at the rear of the aircraft and comprising an extendable arm configured to grasp recovery cable from the first selective grapple and pull the recovery cable along with the deployable operating platform system into the aircraft; and
- a recovery bay disposed within the aircraft and configured to receive the deployable operating platform system, wherein said recovery bay comprises a strap system and wherein the strap system is configured to affix the deployable operating platform system to the recovery bay after retrieval;

loading the platform system onto the aircraft and executing a built-in test ("BIT Test") using BIT check system to test components including circuits, link, control servers, transmitter/receiver system and radiator/altimeter;

energizing a flight power system via the generator;
establishing a satellite communications link;
deploying the platform system from the aircraft at which time the deployable powered parachute system guides the platform system to land at the target destination with assistance of a propulsion system, and a guidance navigation system, wherein if the platform system deviates from the target destination an operator will take control via a satellite communications link with a high frequency remote control and control the platform system to the target destination;
detaching the deployable powered parachute system from the platform system;
activating the AV, a base control system, and the communications systems;
deploying the AV from the platform system in either a tethered or untethered state;
using the AV laser and camera on the AV to spot the target area via either wired or wireless communications and transmitting information such as images, video, live video feed, light impulse signs, and communications to the heads-up display;
guiding the AV via a ground team operator to a position vertically above a target area, wherein the laser operated by the ground team is configured to direct the AV to the target area;
guiding the AV back to the platform system;
deploying the recovery device and the attached recovery cable;
contacting the recovery cable via the v-bars and directing the recovery cable to the first grapple system;
gripping the recovery cable by the first grapple system and pulling the recovery cable to the back of the aircraft;
gripping the recovery cable via the second grapple system and reeling the recovery cable and platform system into the aircraft; and
securing platform system to aircraft via strap system.

* * * * *